United States Patent
Lalonde et al.

(10) Patent No.: US 10,480,947 B2
(45) Date of Patent: Nov. 19, 2019

(54) BOOLEAN SATISFIABILITY (SAT) REDUCTION FOR GEOMETRY AND KINEMATICS AGNOSTIC MULTI-AGENT PLANNING

(71) Applicant: X Development LLC, Mountain View, CA (US)

(72) Inventors: Geoffrey Lalonde, La Honda, CA (US); Peter Anderson-Sprecher, Los Altos Hills, CA (US)

(73) Assignee: X Development LLC, Mountain View, CA (US)

( * ) Notice: Subject to any disclaimer, the term of this patent is extended or adjusted under 35 U.S.C. 154(b) by 185 days.

(21) Appl. No.: 15/387,503

(22) Filed: Dec. 21, 2016

(65) Prior Publication Data

US 2018/0172450 A1 Jun. 21, 2018

(51) Int. Cl.
*G01C 21/20* (2006.01)
*G01C 21/34* (2006.01)

(52) U.S. Cl.
CPC .......... *G01C 21/206* (2013.01); *Y10S 901/01* (2013.01)

(58) Field of Classification Search
CPC .......... G06F 17/30958; G06F 17/5086; G06F 17/5095; G06F 2217/06; G06F 7/20;

(Continued)

(56) References Cited

U.S. PATENT DOCUMENTS

| | | | |
|---|---|---|---|
| 5,230,061 A | * | 7/1993 | Welch ............... G05B 19/052 706/46 |
| 6,049,756 A | | 4/2000 | Libby |

(Continued)

FOREIGN PATENT DOCUMENTS

| WO | 2005/096114 A1 | 10/2015 | |
|---|---|---|---|
| WO | 2016/122840 A1 | 1/2016 | |
| WO | WO-2017139613 A1 * | 8/2017 | ............ B25J 9/1664 |

OTHER PUBLICATIONS

NPL by ArcBotics titled: "Maze Solving Home Lessons"; dated Aug. 19, 2015, 15 pages.*

(Continued)

*Primary Examiner* — Nicholas Kiswanto
(74) *Attorney, Agent, or Firm* — McDonnell Boehnen Hulbert & Berghoff LLP

(57) ABSTRACT

Systems and methods related to roadmaps for robotic devices are provided. A computing device can receive a roadmap representing a plurality of paths through an environment. The computing device can discretize the roadmap to obtain a discrete planning graph having a plurality of states corresponding to discretized segments of the plurality of paths of the roadmap such that states corresponding to adjacent discretized path segments are connected in the discrete planning graph. The computing device can determine a Boolean equation representing at least a portion of the discrete planning graph. The computing device can determine a sequence of states from the plurality of states of the discrete planning graph such that the determined sequence of states satisfies the Boolean equation. The computing device can provide a route through the environment for a robotic device based on the determined sequence of states.

19 Claims, 19 Drawing Sheets

(58) Field of Classification Search
CPC ......... G06F 17/30377; G06F 17/30486; G06F 17/509; G06N 7/005; G06N 5/047; G01C 21/3453; G01C 21/206; G01C 21/3446; G01C 21/3492; G01C 21/3664; G01C 21/367; G05D 1/0212; G05D 1/0274; G05D 1/0289; G05D 1/0291; G05D 1/0297; G05D 2201/0216; B25J 9/1666; G08G 1/096827; G08G 1/09685; G08G 1/096866; H03M 7/3068; H03M 7/40; H03M 7/4043; H03M 7/70; H03M 7/705
USPC ............ 701/25, 26, 411, 527, 533; 700/258; 703/2; 345/474
See application file for complete search history.

(56) References Cited

U.S. PATENT DOCUMENTS

| | | | |
|---|---|---|---|
| 6,496,961 B2* | 12/2002 | Gupta | G01R 31/318357 703/2 |
| 7,974,737 B2 | 7/2011 | Tilove et al. | |
| 8,200,594 B1* | 6/2012 | Bleiweiss | G06T 19/003 345/474 |
| 8,576,235 B1 | 11/2013 | Sumner et al. | |
| 8,630,762 B2 | 1/2014 | Staempfle et al. | |
| 8,948,959 B2 | 2/2015 | Maggi | |
| 8,972,056 B2 | 3/2015 | Petersen et al. | |
| 2005/0216181 A1* | 9/2005 | Estkowski | G01C 21/20 701/411 |
| 2011/0190933 A1* | 8/2011 | Shein | B62D 55/075 700/258 |
| 2013/0173152 A1* | 7/2013 | Schilling | H03M 7/40 701/527 |
| 2014/0019400 A1* | 1/2014 | Trefler | G06F 8/311 706/47 |
| 2014/0032035 A1* | 1/2014 | Thomson | G05D 1/0274 701/25 |
| 2014/0107987 A1* | 4/2014 | Fertig | G06F 17/5095 703/2 |
| 2014/0121833 A1 | 5/2014 | Lee et al. | |
| 2014/0214469 A1 | 7/2014 | Callow et al. | |
| 2014/0277691 A1 | 9/2014 | Jacobus et al. | |
| 2014/0350831 A1 | 11/2014 | Hoffman et al. | |
| 2015/0234386 A1 | 8/2015 | Zini et al. | |
| 2015/0251315 A1 | 9/2015 | Brandenberger | |
| 2016/0033971 A1* | 2/2016 | Thomson | G05D 1/0274 701/26 |
| 2016/0178386 A1* | 6/2016 | Schilling | H03M 7/40 701/533 |
| 2016/0371333 A1* | 12/2016 | Fertig | G06F 17/5095 |
| 2017/0004406 A1* | 1/2017 | Aghamohammadi | G06N 5/045 |
| 2017/0193377 A1* | 7/2017 | Fertig | G06N 5/047 |
| 2017/0193378 A1* | 7/2017 | Fertig | G06N 5/047 |
| 2017/0219364 A1* | 8/2017 | Lathrop | G01C 21/3453 |
| 2018/0001472 A1* | 1/2018 | Konidaris | B25J 9/1666 |

OTHER PUBLICATIONS

P. Abbeel, "Optimal Control for Linear Dynamical Systems and Quadratic Cost ('LQR')", Sep. 4, 2012, available via the Internet at people.eecs.berkeley.edu/~pabbeel/cs287-fa12/slides/LQR.pdf (last visited Oct. 27, 2016).

M. H. Bowling et al., "Multiagent Planning in the Presence of Multiple Goals", Planning in Intelligent Systems: Aspects, Motivations, and Methods, Feb. 15, 2006, Chapter 10, available via the Internet at www.cs.cmu.edu/~mmv/papers/05planning.pdf (last visited Oct. 5, 2016).

V. Digani et al., "Ensemble Coordination Approach to Multi-AGV Systems Applied to Industrial Warehouses", IEEE Transactions on Automation Science and Engineering, vol. 12, No. 3, Jul. 2015, pp. 922-934.

D. Fox et al., "The Dynamic Window Approach to Collision Avoidance", Jun. 25, 1996, available via the Internet at www.ri.cmu.edu/pub_files/pub1/fox_dieter_1997_1/fox_dieter_1997_1.pdf (last visited Dec. 20, 2016).

R. M. Jensen et al., "ASET: a Multi-Agent Planning Language with Nondeterministic Durative Tasks for BDD-Based Fault Tolerant Planning", Apr. 20, 2005, available via the Internet at www.cs.cmu.edu/~mmv/papers/05icapsw-aset.pdf (last visited Dec. 20, 2016).

L. E. Kavraki et al., "Probabilistic Roadmaps for Path Planning in High-Dimensional Configuration Spaces", IEEE Transactions on Robotics and Automation, vol. 12, No. 4, Aug. 1996, pp. 566-570.

A. Majumdar et al., "Multi-Query Feedback Motion Planning with LQR-Roadmaps", Mar. 30, 2011, available via the Internet at groups.csail.mit.edu/robotics-center/public_papers/Majumdar11.pdf (last visited Dec. 20, 2016).

S. Saha et al., "Trajectory-Based Formal Controller Synthesis for Multi-Link Robots with Elastic Joints", Dec. 15, 2014, 2014 IEEE 53rd Annual Conference on Decision and Control (CDC).

D. Silver, "Cooperative Pathfinding", Nov. 14, 2015, Eleventh Annual AAAI Conference on Artificial Intelligence and Interactive Digital Entertainment.

J. M. V. Ventura, "Safe and flexible hybrid control architecture for the navigation in formation of a group of vehicles", Oct. 26, 2015, Ph.D. Thesis, Universite Blaise Pascal—Clermont-Ferrand II, Clermont-Ferrand, France.

Wikimedia Foundation, "Robotics/Navigation/Trajectory Planning", Nov. 4, 2016, available via the Internet at en.wikibooks.org/w/index.php?title=Robotics/Navigation/Trajectory_Planning&oldid=3142754 (last visited Dec. 20, 2016).

R. Yehoshua, "Sample based motion planning—Roadmaps and RRTs", Jan. 11, 2014, available via the Internet at u.cs.biu.ac.il/~yehoshr1/89-685/Fall2013/TheoryLessons/Lec9-Short.pdf (last visited Oct. 5, 2016).

J. Yu et al., "Planning Optimal Paths for Multiple Robots on Graphs", May 10, 2013, 2013 IEEE International Conference on Robotics and Automation (ICRA).

* cited by examiner

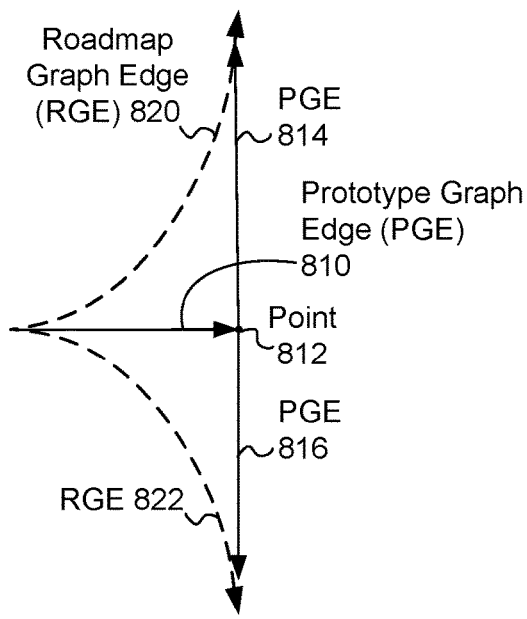
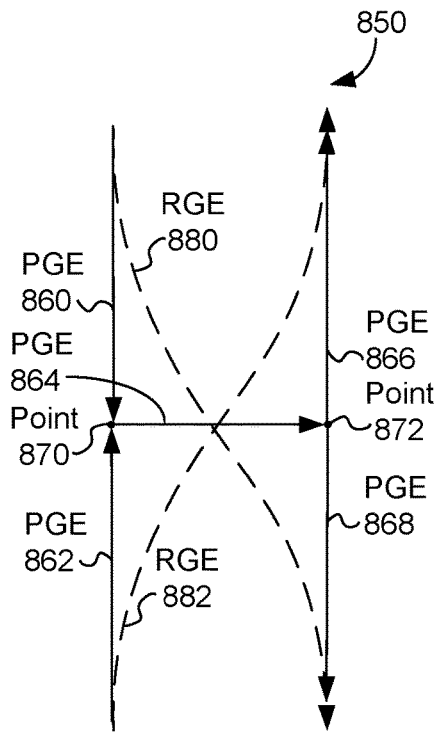
FIG. 8A  FIG. 8B
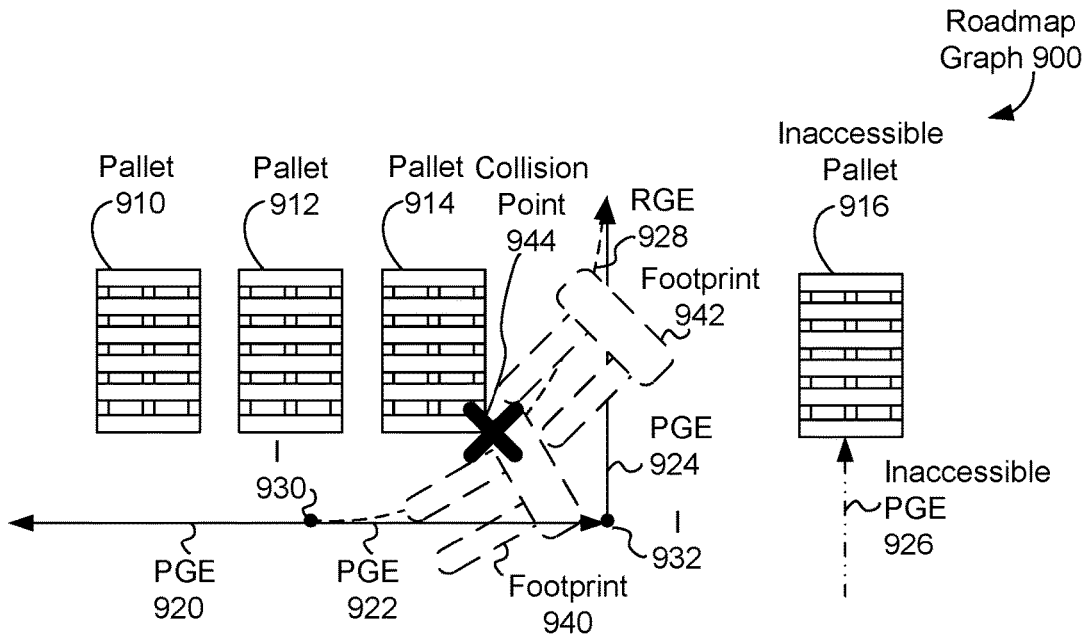
FIG. 9

1910 Determine, by a computing device, a roadmap including a path associated with a starting pose and an ending pose to be traversed by a robotic device in an environment 1920 Generate, by the computing device, a plurality of trajectories from the starting pose, where each trajectory of the plurality of trajectories includes a steering position and a traction velocity for directing the robotic device during a planning time interval 1930 For each trajectory, determine, by the computing device, a score for the trajectory indicative of advancement from the starting pose toward the ending pose after simulating the steering position and the traction velocity for the planning time interval 1940 Select, by the computing device, a nominal trajectory from among the scored plurality of trajectories 1950 Store, by the computing device, the nominal trajectory with the roadmap 1960 Receive, at the computing device, a first request to provide a route though the environment 1970 Send, by the computing device, a first response to the first request, the first response including a portion of the roadmap, where the portion of the roadmap includes the stored nominal trajectory

2010 Receive, by a computing device, a roadmap representing a plurality of paths through an environment 2020 Discretize the roadmap, by the computing device, to obtain a discrete planning graph, where the discrete planning graph includes a plurality of states corresponding to discretized path segments of the plurality of paths of the roadmap such that states corresponding to adjacent discretized path segments are connected in the discrete planning graph 2030 Determine, by the computing device, a Boolean equation representing at least a portion of the discrete planning graph 2040 Determine, by the computing device, a sequence of states from the plurality of states of the discrete planning graph such that the determined sequence of states satisfies the Boolean equation 2050 Provide, by the computing device, a route through the environment for a robotic device based on the determined sequence of states

FIG. 20

BOOLEAN SATISFIABILITY (SAT) REDUCTION FOR GEOMETRY AND KINEMATICS AGNOSTIC MULTI-AGENT PLANNING

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

Mobile robotic devices can be used in a number of different environments to accomplish a variety of tasks. For example, mobile robotic devices can deliver items, such as parts or completed products, within indoor environments, such as warehouses, hospitals and/or data centers. When mobile robotic devices are deployed, they can use one or more possible paths to and from delivery and/or other locations. These paths can be determined using one or more route planning algorithms.

SUMMARY

In one aspect, a method is provided. A computing device determines a roadmap including a path associated with a starting pose and an ending pose to be traversed by a robotic device in an environment. The computing device generates a plurality of trajectories from the starting pose, where each trajectory of the plurality of trajectories includes a steering position and a traction velocity for directing the robotic device during a planning time interval. For each trajectory, the computing device determines a score for the trajectory indicative of advancement from the starting pose toward the ending pose after simulating the steering position and the traction velocity for the planning time interval. The computing device selects a nominal trajectory from among the scored plurality of trajectories. The computing device stores the nominal trajectory with the roadmap. The computing device receives a first request to provide a route through the environment. The computing device sends a first response to the first request, the first response including a portion of the roadmap, where the portion of the roadmap includes the stored nominal trajectory.

In another aspect, a computing device is provided. The computing device includes one or more processors and data storage. The data storage includes at least computer-executable instructions stored thereon that, when executed by the one or more processors, cause the computing device to perform functions. The functions include: determining a roadmap including a path associated with a starting pose and an ending pose, the path to be traversed by a robotic device in an environment; generating a plurality of trajectories from the starting pose, where each trajectory of the plurality of trajectories includes a steering position and a traction velocity for directing the robotic device during a planning time interval; for each trajectory, determining a score for the trajectory indicative of advancement from the starting pose toward the ending pose after simulating the steering position and the traction velocity for the planning time interval; selecting a nominal trajectory from among the scored plurality of trajectories; storing the nominal trajectory with the roadmap; receiving a first request to provide a route through the environment; and sending a first response to the first request, the first response including a portion of the roadmap, where the portion of the roadmap includes the stored nominal trajectory.

In another aspect, a non-transitory computer readable medium is provided. The non-transitory computer readable medium has stored thereon instructions, that when executed by one or more processors of a computing device, cause the computing device to perform functions. The functions include: determining a roadmap including a path associated with a starting pose and an ending pose, the path to be traversed by a robotic device in an environment; generating a plurality of trajectories from the starting pose, where each trajectory of the plurality of trajectories includes a steering position and a traction velocity for directing the robotic device during a planning time interval; for each trajectory, determining a score for the trajectory indicative of advancement from the starting pose toward the ending pose after simulating the steering position and the traction velocity for the planning time interval; selecting a nominal trajectory from among the scored plurality of trajectories; storing the nominal trajectory with the roadmap; receiving a first request to provide a route through the environment; and sending a first response to the first request, the first response including a portion of the roadmap, where the portion of the roadmap includes the stored nominal trajectory.

In another aspect, a device is provided. The device includes: means for determining a roadmap including a path associated with a starting pose and an ending pose, the path to be traversed by a robotic device in an environment; means for generating a plurality of trajectories from the starting pose, where each trajectory of the plurality of trajectories includes a steering position and a traction velocity for directing the robotic device during a planning time interval; means for determining, for each trajectory, a score for the trajectory indicative of advancement from the starting pose toward the ending pose after simulating the steering position and the traction velocity for the planning time interval; means for selecting a nominal trajectory from among the scored plurality of trajectories; means for storing the nominal trajectory with the roadmap; means for receiving a first request to provide a route through the environment; and means for sending a first response to the first request, the first response including a portion of the roadmap, where the portion of the roadmap includes the stored nominal trajectory.

In yet another aspect, a method is provided. A computing device receives a roadmap representing a plurality of paths through an environment. The computing device discretizes the roadmap to obtain a discrete planning graph, where the discrete planning graph includes a plurality of states corresponding to discretized path segments of the plurality of paths of the roadmap such that states corresponding to adjacent discretized path segments are connected in the discrete planning graph. The computing device determines a Boolean equation representing at least a portion of the discrete planning graph. The computing device determines a sequence of states from the plurality of states of the discrete planning graph such that the determined sequence of states satisfies the Boolean equation. The computing device provides a route through the environment for a robotic device based on the determined sequence of states.

In another aspect, a computing device is provided. The computing device includes one or more processors and data storage. The data storage includes at least computer-executable instructions stored thereon that, when executed by the one or more processors, cause the computing device to perform functions. The functions include: receiving a roadmap representing a plurality of paths through an environment; discretizing the roadmap to obtain a discrete planning graph, where the discrete planning graph includes a plurality of states corresponding to discretized path segments of the plurality of paths of the roadmap such that states corresponding to adjacent discretized path segments are connected in the discrete planning graph; determining a Boolean equation representing at least a portion of the discrete planning graph; determining a sequence of states from the plurality of states of the discrete planning graph such that the determined sequence of states satisfies the Boolean equation; and providing a route through the environment for a robotic device based on the determined sequence of states.

In another aspect, a non-transitory computer readable medium is provided. The non-transitory computer readable medium has stored thereon instructions, that when executed by one or more processors of a computing device, cause the computing device to perform functions. The functions include: receiving a roadmap representing a plurality of paths through an environment; discretizing the roadmap to obtain a discrete planning graph, where the discrete planning graph includes a plurality of states corresponding to discretized path segments of the plurality of paths of the roadmap such that states corresponding to adjacent discretized path segments are connected in the discrete planning graph; determining a Boolean equation representing at least a portion of the discrete planning graph; determining a sequence of states from the plurality of states of the discrete planning graph such that the determined sequence of states satisfies the Boolean equation; and providing a route through the environment for a robotic device based on the determined sequence of states.

In another aspect, a device is provided. The device includes: means for receiving a roadmap representing a plurality of paths through an environment; means for discretizing the roadmap to obtain a discrete planning graph, where the discrete planning graph includes a plurality of states corresponding to discretized path segments of the plurality of paths of the roadmap such that states corresponding to adjacent discretized path segments are connected in the discrete planning graph; means for determining a Boolean equation representing at least a portion of the discrete planning graph; means for determining a sequence of states from the plurality of states of the discrete planning graph such that the determined sequence of states satisfies the Boolean equation; and means for providing a route through the environment for a robotic device based on the determined sequence of states.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 8A illustrates a simple intersection, in accordance with an example embodiment.

FIG. 8B illustrates a compound intersection, in accordance with an example embodiment.

FIG. 9 shows aspects of validating a roadmap graph, in accordance with an example embodiment.

FIG. 19 is a flowchart of a method, in accordance with an example embodiment.

FIG. 20 is a flowchart of another method, in accordance with an example embodiment.

DETAILED DESCRIPTION

Pre-Computation of Kinematically Feasible Roadmaps

Figure 1:
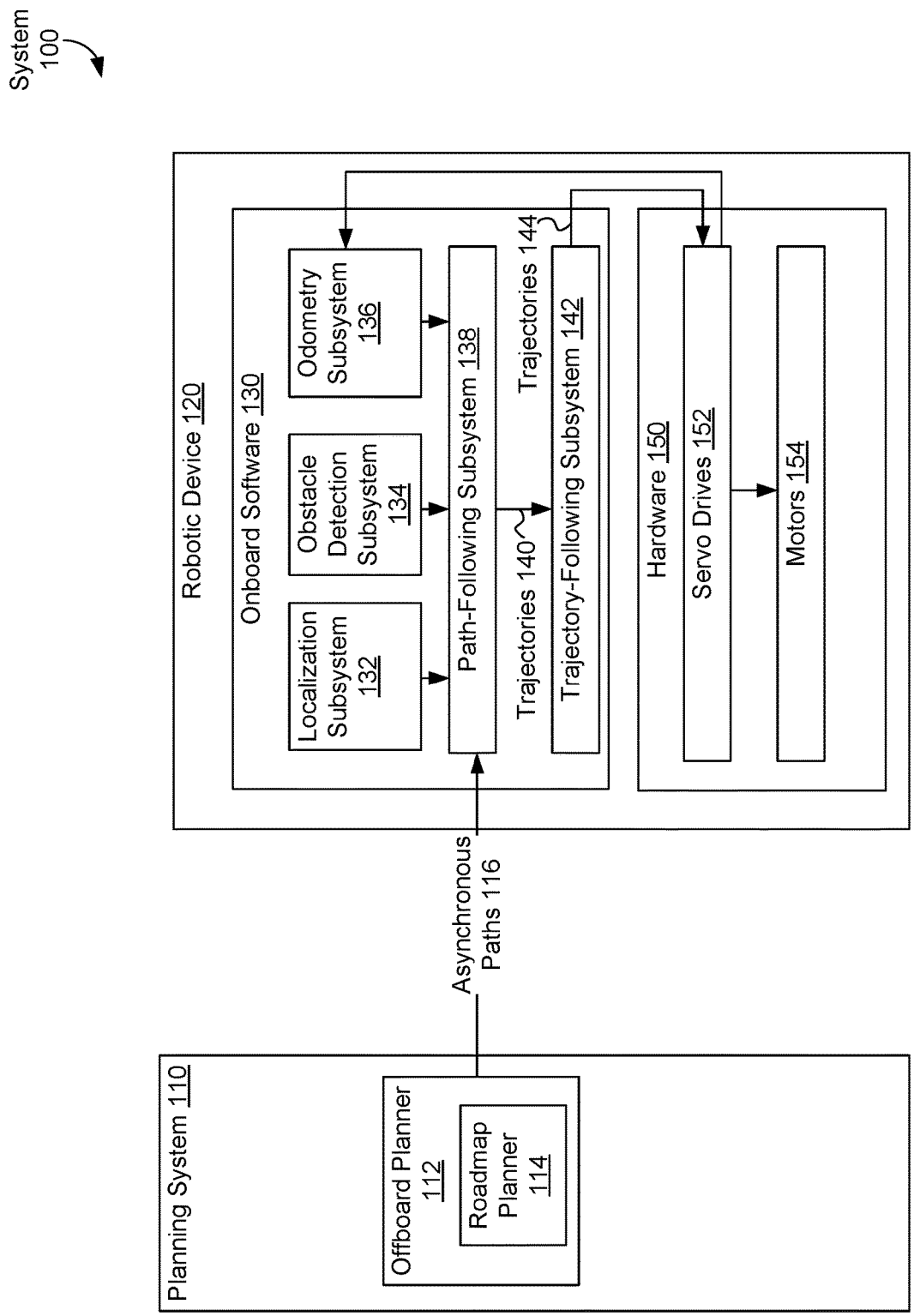
FIG. 1 is a block diagram of a system, in accordance with an example embodiment.

Robot navigation using roadmaps can be useful in many cases, particularly when operating in large environments and with many agents such as robotic devices, as the use of roadmaps can reduce dimensionality of a search space for finding non-conflicting paths for each agent in the (large) environment. Precomputation of trajectories also can be useful, as precomputation, storage, and retrieval of trajectories feasibly allows more computationally "expensive" trajectory generation than possible in real time aboard a robotic device; i.e., trajectories that take more processing time and/or memory than feasible in real time aboard the robotic device. In general, a trajectory can include one or more dynamically feasible positions and velocities for a robotic device, as well as any joint states (e.g. steering). For example, a trajectory for a steered robotic device, such as the robotic devices described herein, can include a steering position and a traction velocity for directing the robotic device during a planning time interval or other duration of time.

One technique to precompute trajectories can begin by identifying a network of poses in an environment that an agent likely will navigate. A pose of an agent, such as a robotic device, can include a position and an orientation of at least a portion of the agent; e.g., the position and orientation of a body of a robotic device. In one example, the network of poses can be identified using a prototype graph, roadmap, or other representation of the environment. A prototype graph can include one or more intersections connected by one or more edges, where each intersection can indicate an operational location in the environment, and where the edge(s) connect the intersection(s). An operational location can be a location at or near a pallet of goods, a location at a charging station, a location of a loading dock, a location of a junction between edges, or other location of interest for operating in an environment.

The network of poses can correspond to some or all of the locations and orientations indicated by the intersections of the prototype graph. In another example, the network of poses can be identified by sampling the environment for poses using a probabilistic roadmap technique, Rapidly-expanding Random Trees (RRT), and/or other sampling techniques.

The poses can be connected by trajectories using a trajectory optimization framework, where constraints between adjacent poses can be used to reflect kinematics of an agent, dynamics of the agent, and/or obstacle avoidance. For example, a trajectory can include a starting pose and an ending pose, and more particularly, the starting pose can be associated with a starting time and the ending pose can be associated with an ending time that is after the starting time. In some examples, the trajectory optimization framework can be solved using software such as the Sparse Nonlinear Optimizer software package (SNOPT), the Interior Point Optimizer software package (IPOPT), and/or other software. In other examples, the constraints can be modeled as costs of a cost function for a trajectory between poses and a lowest cost trajectory ("LCT") can be selected as a locally optimal trajectory according to the cost function.

A planning system can precompute or otherwise determine the trajectories between poses and store the trajectories for later use. One or more trajectories can be determined by sampling trajectories over a two-dimensional space, with a first dimension being steering position values, and a second dimension being traction velocity values (or vice versa). Each sampled pair of steering position and traction velocity values can correspond to a trajectory to be followed for a planning time interval by a robotic device. Each of the one or more trajectories can then be scored, or graded, to determine advancement of the robotic device toward a destination, where advancement can be measured or otherwise determined with respect to one or more trajectory costs. For example, suppose a robotic device that follows an LCT of a plurality of trajectories toward the destination, where LCT has a lowest cost according to the trajectory cost(s) over all of the plurality of trajectories. Then, by following LCT, the robotic device can be said to have best advanced toward the destination with respect to one or more trajectory costs. One example destination can be an expected ending pose of the robotic device at the end of the planning time interval; other destinations are possible as well.

These trajectory costs can include, but are not limited to, costs that indicate: traversal time for the robotic device, how closely the robotic device approaches one or more obstacles in the environment, and actuator acceleration. In other examples, other trajectory costs can be considered instead, or as well.

A multi-agent planner can plan over the network of poses and trajectories using a graph planning technique (e.g., A*). Once a plan is determined, part or the entire plan can be provided to one or more agents, which can directly follow segments of the plan; e.g., part or all of one or more trajectories, for onboard navigation. In one example, an agent can follow along a provided trajectory and score its progress along the provided trajectory based on one or more costs, such as, but not limited to costs associated with: obstacle avoidance, path distance, progress toward a goal, and steering angle. As another example, an agent can follow the one or more trajectories directly, such as by using a time varying linear quadratic regulator (LQR) technique and/or an iterative LQR technique to adjust trajectories closer to current state before following them.

Using trajectories to travel between poses can increase efficiency of agents operating in an environment, as trajectories can change over time to take changes in agent kinematics, agent dynamics, and/or in the environment (e.g., addition of obstacles) into account. That is, trajectories can be adapted to specific conditions of an agent and/or the environment as they arise.

Using Boolean Equations in Geometric/Kinematic-Agnostic Multi-Agent Planning

Disclosed are techniques for reducing a multi-agent path finding (MAPF) problem that can, for example be used to plan routes for mobile robotic devices acting as agents, into a Boolean equation. A route for mobile robotic devices can specify how the robotic device is to go from a starting point to an ending point, where the starting point can be specified as a starting location or starting pose and the ending point can be specified as an ending location or ending pose. In some examples, the Boolean equation can be solved efficiently by one or more existing Boolean satisfiability (SAT) solvers. In particular, the herein-described techniques related to using roadmap segmentation to aid in reducing multi-agent path finding problems to Boolean equations that describe a complete solution for coordinating multiple robotic devices. In some examples, the reduction of the multi-agent path finding problems to Boolean equations have few or no restrictions on kinematics of robotic devices or a geometry of a roadmap, save that the kinematics and geometry are representable in the roadmap. Depending on the requirements and computation available, the resulting solutions can be optimal with respect to metrics such as a "makespan" metric measuring a time to complete a set of tasks and/or a "flow time" metric measuring a sum of time to complete each individual task in a set of tasks.

A roadmap can provide a relatively small but expressive configuration space that is kinematically feasible for any robotic device representable using a roadmap, which can be a relatively-large class of robotic devices. Many of this relatively-large class of robotic devices are not covered by existing MAPF to SAT reductions. For example, solutions relying on existing MAPF to SAT reductions may be applicable only to robots that can move between discrete intersections or nodes in a configuration space without affecting any intersections that are not being immediately traversed. These restrictions on intersections, configuration spaces, and robotic devices can be very confining; e.g., coordinated multi-agent planning for robotic devices is typically only enabled for robotic devices whose footprint cross sections are independent of their direction of motion and/or small robotic devices in an open space and/or a "gridworld" or an environment representable as a collections of uniform cells arranged in a matrix or grid.

One technique for performing MAPF to SAT reduction can include the following actions 1-6.

1. A roadmap (such as a geometric graph) can be generated for a robotic device having a particular kinematic model. For example, the roadmap can model an environment, where the roadmap includes a plurality of intersections representing locations in the environment and a plurality of edges that connect some or all of the plurality of intersections, and where the edges represent paths to be traveled within the environment by a robotic device representable by the particular kinematic model.

2. The roadmap can be sparsified as much as possible. That is, sparsification can involve removing any intersections that may exist as artifacts of construction such that every path connecting intersections is as long and contiguous as possible. Sparsification can be used to reduce or eliminate discretization artifacts that may arise in the next action.

3. A discrete planning graph can be generated by discretizing, or adding intersections added to, each edge (or path) of the roadmap so that each resulting discretized edge (or path) segment has a substantially uniform cost for each edge (or path). The discrete planning graph can include a plurality of states, where each state in the discrete planning graph can correspond to a discretized edge (or path) segment of the roadmap, and states of the discrete planning graph are connected in accord with connectivity between edge (or path) segments of the roadmap. For example, suppose an edge of the roadmap is discretized based on a uniform edge cost into three connected edge segments—ES1, which is connected to ES2, which is connected to ES3. Then, the corresponding discrete planning graph can include three corresponding states S1, S2, and S3, where S1 is connected to S2, and S2 can be connected to S3.

The uniform edge (or path) cost can be based on time, length, workload, and/or one or more other parameters. For example, if a multi-agent planner is attempting to find a time-efficient or time-optimal solution, the cost can be based on a time parameter. In this example, a roadmap with a plurality of paths can discretized adding intersections to each path so that each resulting discretized path segment takes substantially a same time TS1 to travel between intersections. Then, each state in a discrete planning graph corresponding to the discretized path segments can represent a discrete unit of travel along the now-discretized paths that has as close to a uniform cost as possible according to the time parameter. Thus, the resulting discrete planning graph can be an analogous representation of the environment to a gridworld with a uniform cost for movement between two connected states, as each of the discrete planning graph and the gridworld can be considered as a discretization of a continuous space for the purpose of simplifying planning and coordination between robotic devices.

In some examples, optimality of MAPF solutions using the discrete planning graph can depend on a limit of discretization, indicating that more edges means closer to optimal MAPF solutions, but also involves more computation to find the MAPF solution. In other examples, a planning time interval can be based on the value of time TS1 to travel between intersections of the now-discretized paths; e.g., the planning time interval can be determined to be: TS1 seconds, a multiple of TS1 seconds, a sum of a multiple of TS1 seconds and a constant value, or some other value based on the TS1 value. Other values and techniques for determining the planning time interval are possible as well.

4. A footprint, or surface space covered by a robotic device, can be determined and swept across each edge (or path or path segment) in the discrete planning graph. If the swept regions of two or more edges (or paths or path segments) intersect, classify the intersection as a conflict. In some examples where heterogeneous fleets of robotic devices are used, multiple footprints—one for each type of robotic device in the heterogeneous fleet—can be swept across each edge (or path or path segment) in the discrete planning graph. In other examples where heterogeneous fleets of robotic devices are used, a common footprint over all types of robotic devices can be determined, where the common footprint covers each different footprint for a heterogeneous fleet of robotic devices.

5. A Boolean equation can be generated based on the discrete planning graph. In some examples, the Boolean equation can include one or more Boolean variables and can be expressed in Conjunctive Normal Form (CNF). The Boolean equation h can include one or more Boolean "clauses", where a Boolean clause can involve either a single variable or a disjunction/OR statement of two or more variables. Then, a Boolean equation in Conjunctive Normal Form can be expressed as a conjunction/AND statement of one or more Boolean clauses; that is a Conjunctive Normal Form Boolean equation can take the form of an AND of one or more OR clauses, such as (A OR B) AND (C OR D) AND (E OR F OR (NOT G)), where A-G are Boolean variables, "OR" represents disjunction, "AND" represents conjunction, and "NOT" represent negation.

To convert the discrete planning graph into a Boolean equation, a version of the discrete planning graph can be created for a particular "timestep" or interval of time for operating the robotic devices in the environment. Then, the versions of the discrete planning graph representing adjacent timesteps can be connected. Then, the conflicts registered at the previous step can be encoded into the Boolean equation. Also, for every discretized position of a robotic device in a timestep, a discrete set of other positions can be checked for arrival of the robotic device during the time step and each pair of current and other positions can be represented as a ((NOT A) OR (NOT B)) Boolean clause, which represents mutual exclusion of the multiple possible positions that the robotic device can arrive at (or stay at) in the environment represented by the discrete planning graph.

6. In some embodiments, a SAT solver can be applied to the Boolean equation to solve the related MAPF problem.

The herein-described techniques provide advantages related to discretizing a roadmap according to one or more cost parameters, which allows for generation of Boolean equations and related SAT reductions to give feasible, and perhaps optimal, solutions in the number of segments used. Assuming uniform cost per edge (or path) segment of the discretized roadmap (or equivalently, uniform cost per state in a corresponding discrete planning graph), this implies optimal cost within the discretization resolution. Also, the herein-described techniques provide representation of conflicts in discretized edge (or path) segments as Boolean clauses, making such conflicts amenable to solution by a SAT reduction. Further, these conflicts can be represented by a Boolean equation in Conjunctive Normal Form, which can be a desirable form of a Boolean equation for employing some SAT solvers to solve the Boolean equation. Additionally, these herein-described techniques enable improvements to the SAT encoding that allow iterative solutions to incremental formulations of the underlying MAPF problem. The resulting solved Boolean equations can be used to feasibly, and perhaps optimally, guide operations of robotic devices through an environment represented by the discretized roadmaps and discrete planning graphs, even as sizes of environments and numbers of robotic environments scale up.

System Design for Robotic Devices

FIG. 1 is a block diagram of system 100, in accordance with an example embodiment. System 100 includes planning system 110 and robotic device 120. Planning system 110 can include offboard planner 112 that can coordinate motion of one or more robotic devices operating in an environment. Offboard planner 112 can include roadmap planner 114. Offboard planner 112 and/or roadmap planner 114 can generate one or more asynchronous paths 116 for a robotic device, such as robotic device 120, to follow while operating in an environment.

A roadmap graph, prototype graph, or other roadmap representing an environment, such as prototype graph 300 discussed below in the context of FIG. 3, can be received, determined, or otherwise provided to planning system 110, offboard planner 112 and/or roadmap planner 114. Asynchronous paths 116 can be one or more paths based on the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

In some examples, robotic device 120 can be any one or more steered vehicle(s) capable of following a path. For example, robotic device 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. Localization subsystem 132 can be used to localize a robotic device, that is, determine a location of the robotic device within an environment. Localization subsystem 132 can generate position estimates of the robotic device and/or other objects that can be used to localize the robotic device, assist the robotic device in following a path, such as asynchronous paths 116, and/or assist the robotic device in following a trajectory, such as trajectories 140. Once the position estimates are generated, localization subsystem 132 can provide the position estimates to path-following subsystem 138.

An asynchronous path, or path for short, can be a time-invariant plan or other information indicating how robotic device 120 can travel from a starting point SP to an ending point EP; i.e., an (asynchronous) path does not take time into account. In contrast, a trajectory can include values of a steering angle and of traction motor velocity that robotic device 120 can follow for a planning time interval.

The planning time interval can be a duration of time during which a robotic device is guided, or planned, to follow a path, route, and/or travel. In some embodiments, the planning time interval can be a predetermined amount of time; e.g., five seconds, one second, 0.2 seconds, 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servomechanisms and related electrical equipment. In some examples, servo drives 152 can include one or more electronic amplifiers used to power the one or more servomechanisms and/or to monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) of servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
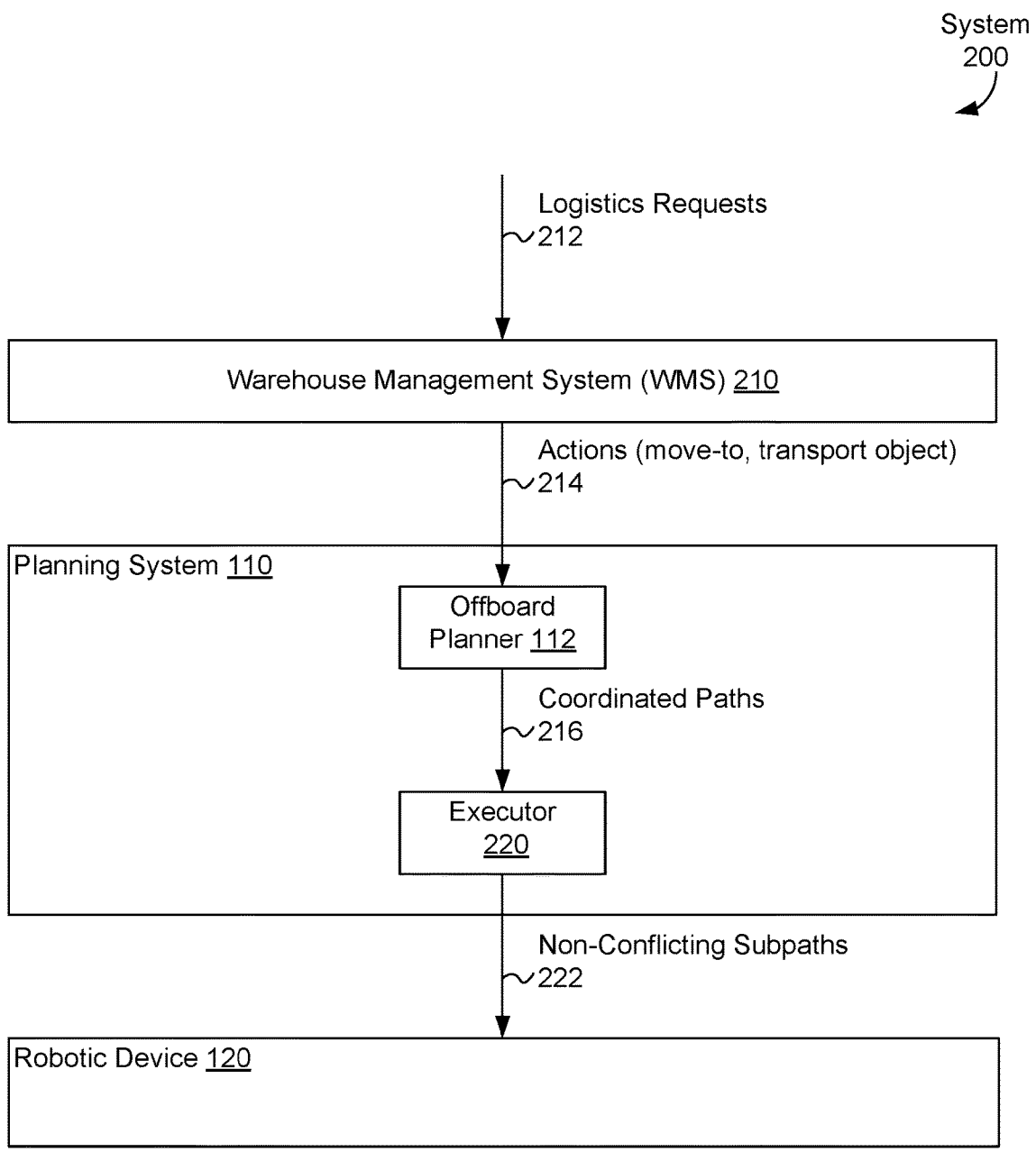
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 220. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can include go-to commands of the form {agent ID, destination}, but other actions are possible such as "move pallet". These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck; for example, any Occupational Safety and Health Administration (OSHA) Class 1 or Class 3 powered industrial truck. In other embodiments, planning system 110 can includes software that executes using one or more networked computing devices located in the "cloud" (e.g., one or more networked computing devices) and/or located somewhere on a premises co-located with robotic device 120.

In some embodiments, offboard planner 112 and executor 220 can be synchronized. In an example embodiment, offboard planner 112 and executor 220 can be implemented on one device; e.g., in planning system 110 or robotic device 120, and synchronized within the device. In another example embodiment, offboard planner 112 and executor 220 can act synchronously in one or more devices.

Figure 3:
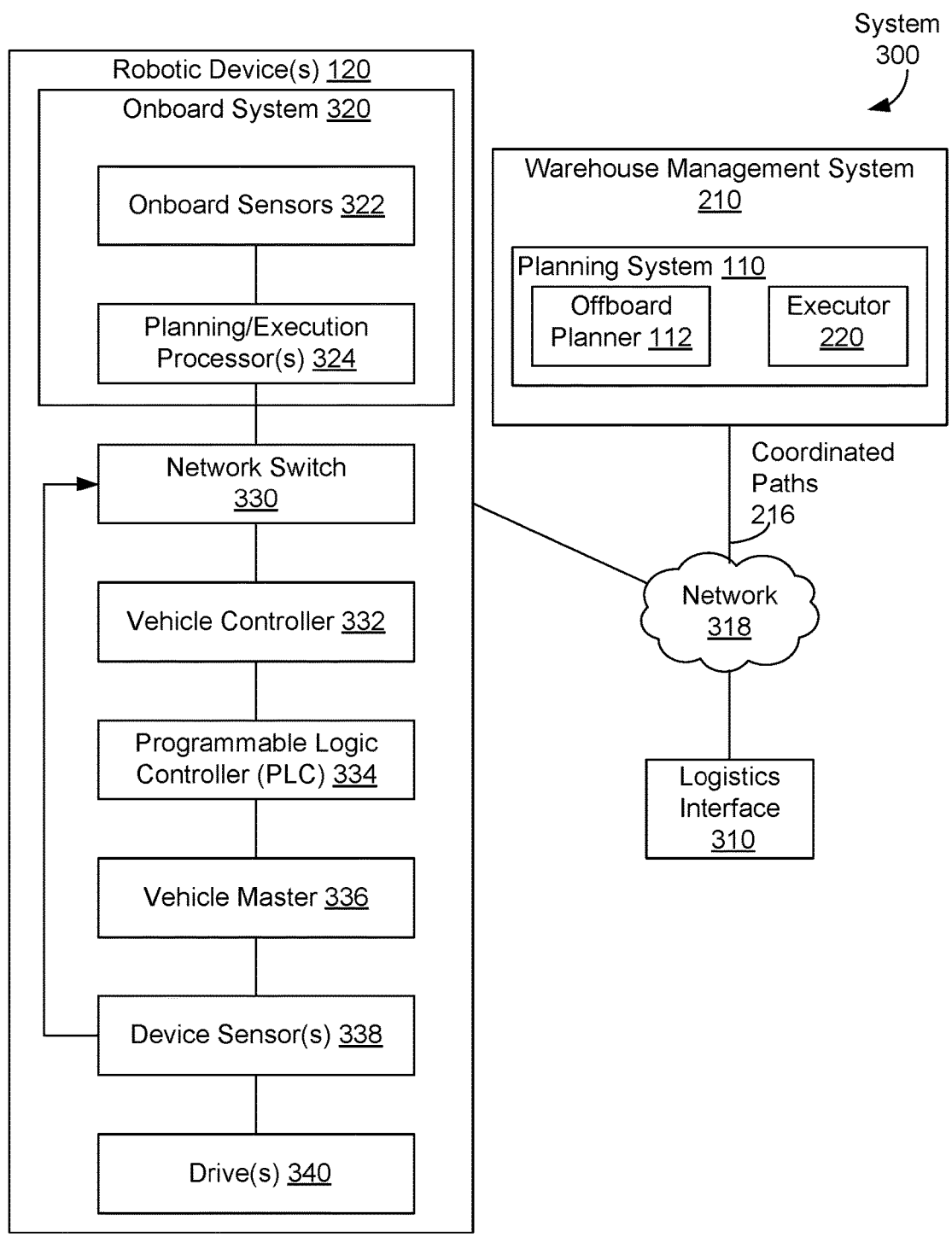
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to move pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1 and 2.

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/ or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/ execution processors 324. FIG. 3 also shows that onboard system 320 that is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost:: signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The vehicle sensor data may be indicative of one or more landmarks/points of interest detected by the vehicle sensors. Alternatively, the data from the vehicle sensors may require processing such that the localization component detects the one or more landmarks/points of interest based on the vehicle sensor data. The pose can be determined relative to the one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g, device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
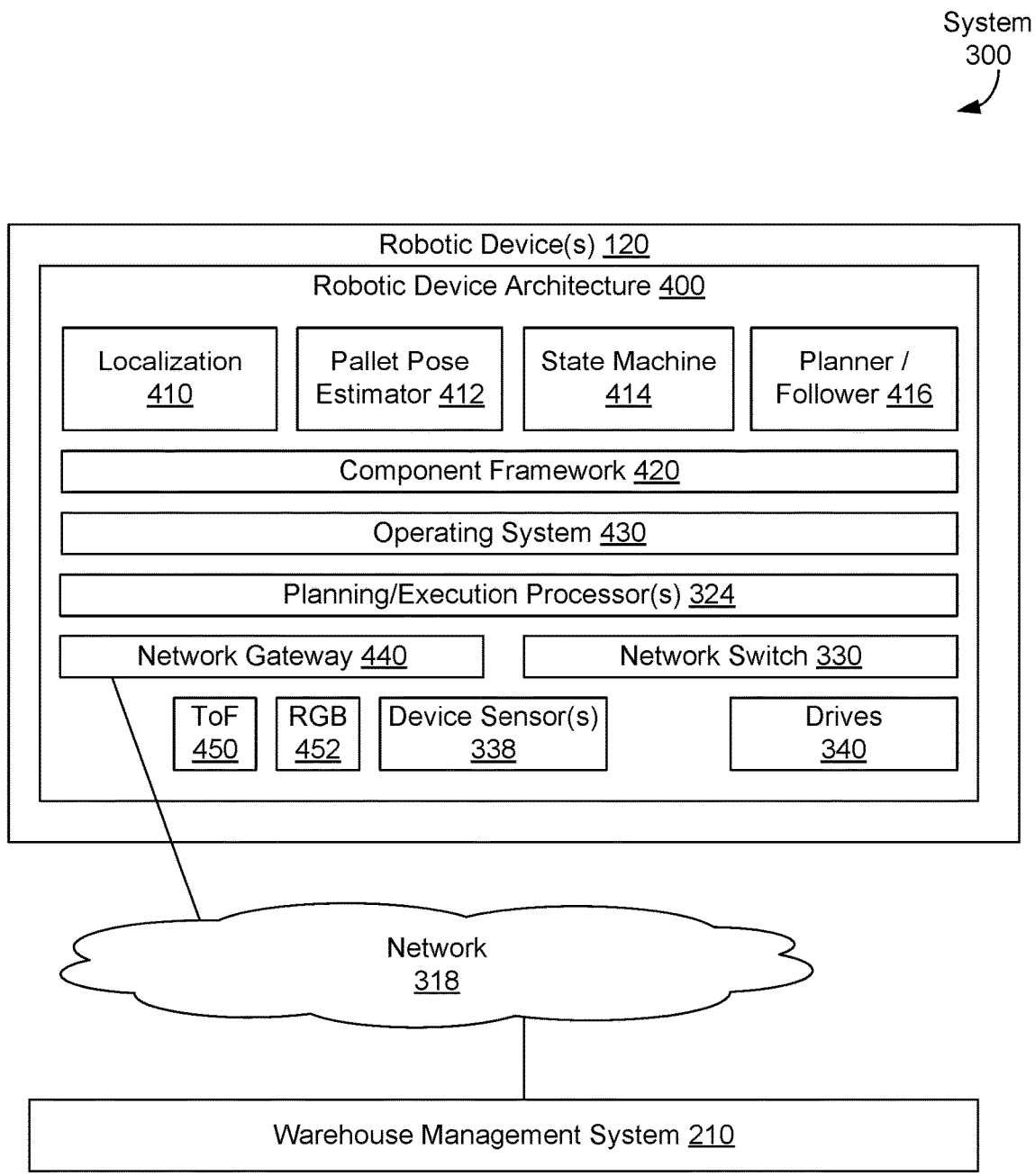
FIG. 4 illustrates a robotic device architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
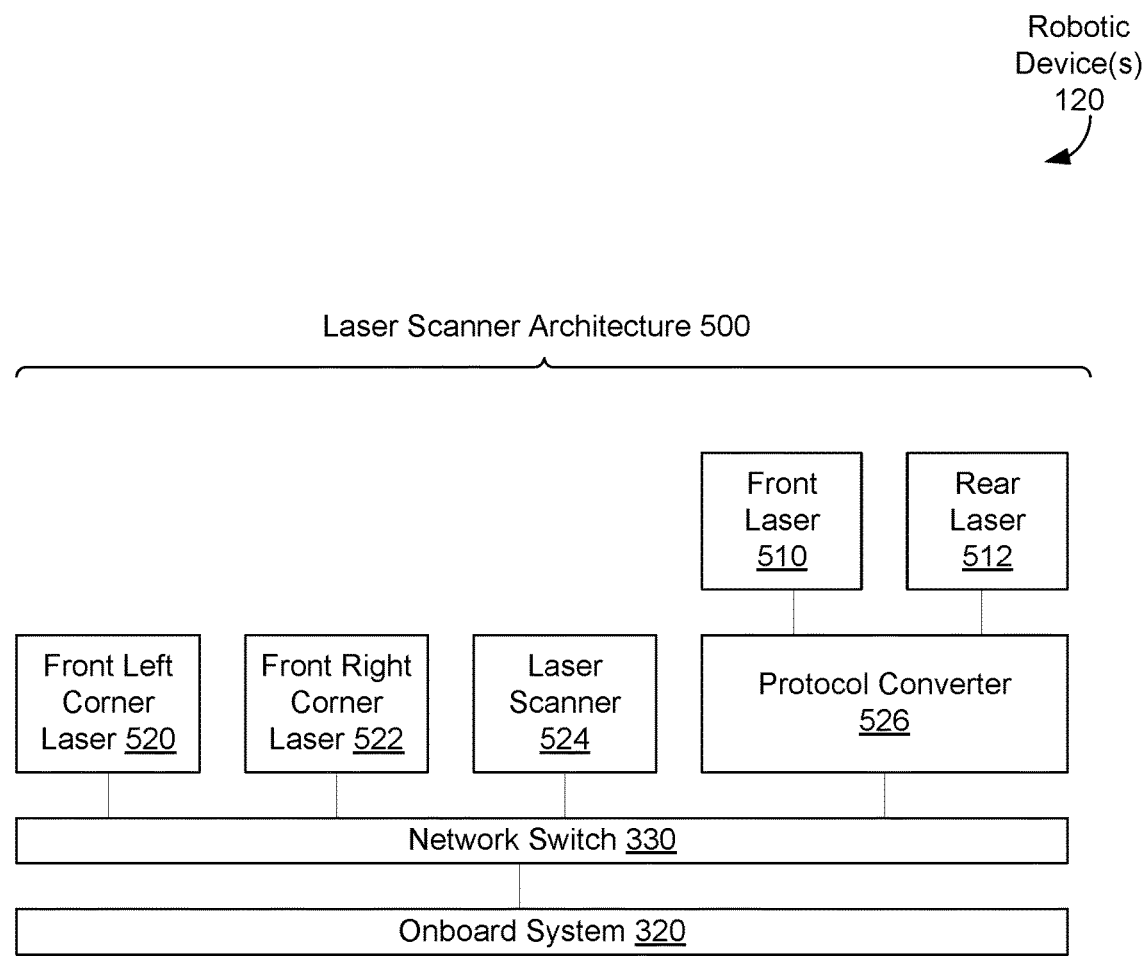
FIG. 5 illustrates a laser scanner architecture for one or more robotic devices, in accordance with an example embodiment.

FIG. 5 illustrates laser scanner architecture 500 for robotic device(s) 120, in accordance with an example embodiment. In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In particular of these embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 1 below.

environment (e.g., a building and an associated parking lot and/or road network). Many other example environments are possible as well.

Prototype graph 600 includes edges (Es) 610a, 610b, 612a, 612b, 614a, 614b, 614c, 614d, 616a, 616b, 616c, 616d, 618a, 618b, 618c, 618d, 620a, 620b, 622a, 622b, 622c, 622d, 622e, 624a, 624b, 626a, 626b, 626c, 628a, 628b, 628c, 628d, 630a, 630b, 630c, 630d, 630e and intersections (Is) 632, 634, 636, 638, 640, 642, 644, 646, 648, 650, 652, 654, 656, 658, 660, 662, 664, 668, 670, 672, 674, 676, 678. In prototype graph 600, edges can come together at intersections. For example, edges 612a, 628a, 612b, and 628b come together at intersection 640.

A prototype graph can provide an outline of traffic flow, but may not take kinematic considerations into account; e.g., intersections at right angles may necessitate slow turn in place motions and so not be ideal from a kinematic navi-

TABLE 1

| Name | Summary | Recovery Strategy |
|---|---|---|
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe distance from known obstacles. | Robotic device will halt and notify human operator. The operator can intervene by manually driving robotic device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

Planning Design for Robotic Devices

Figure 6:
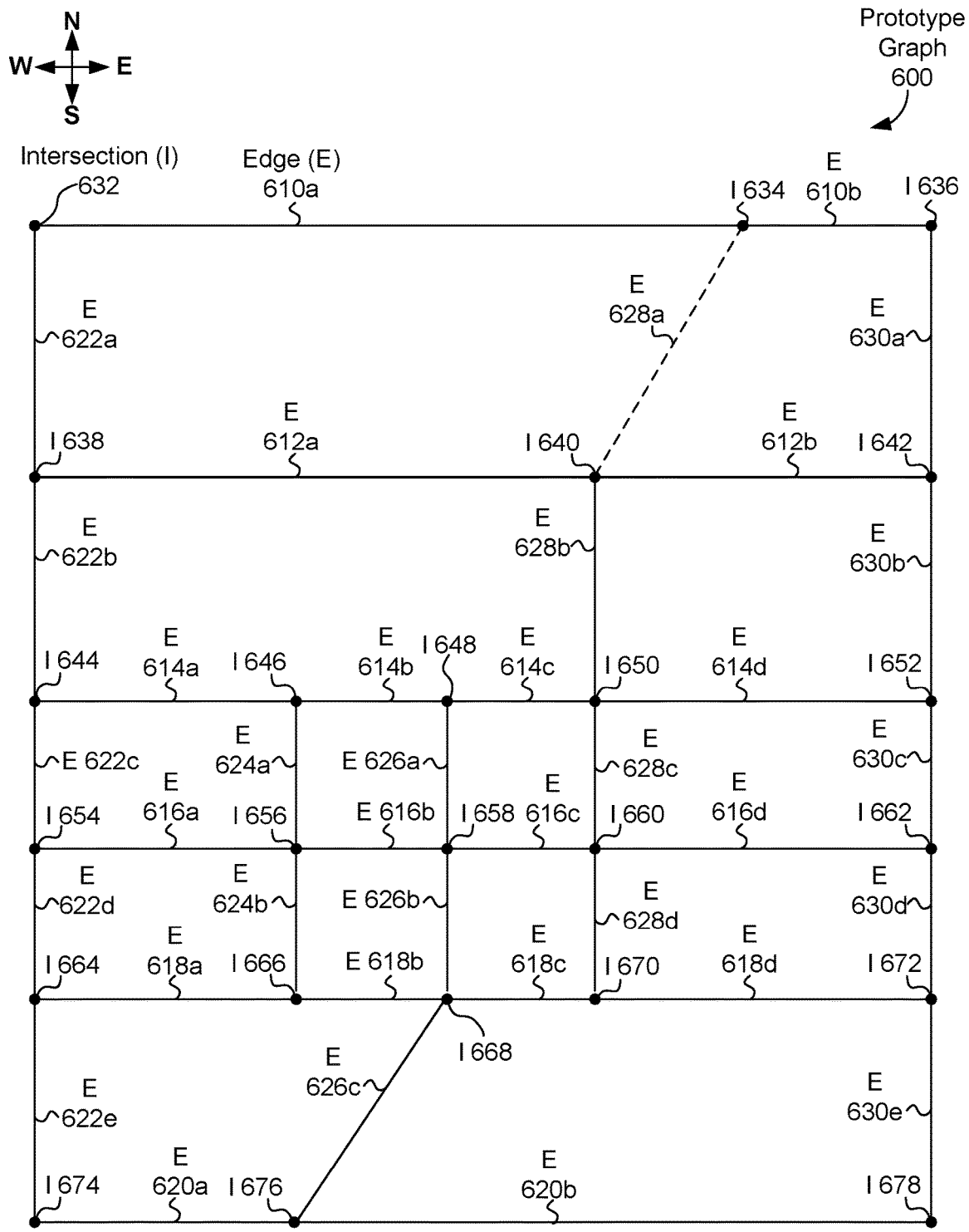
FIG. 6 depicts a prototype graph, in accordance with an example embodiment.

FIG. 6 depicts prototype graph 600, in accordance with an example embodiment. Prototype graph 600 can represent part or all of an environment, such as an indoor environment (e.g., part or all of a warehouse, a factory, office space), an outdoor environment (e.g., part or all of a parking lot, road network, park, farmland), or a combination indoor/outdoor gation perspective. So, after a prototype graph is generated, a roadmap graph can be generated by smoothing the prototype graph to be more congruent with and easily traversable given vehicle kinematics while still approximately following the prototype graph.

The roadmap graph can be generated by identifying intersections or nodes of the prototype graph and replacing all in/out path connections with curves that take kinematics of robotic devices into account. These curves can be track transition curves that in turn are based on Euler spirals. Euler spirals have a property of varying curvature linearly with arc length. Since the curvature of a robotic vehicle's path is roughly proportional to its steering angle for low steering angles, this means that a robotic device can traverse a track transition curve at full speed provided that the curve rate times speed ċv does not exceed what can be achieved at the maximum steering motor speed.

Figure 7:
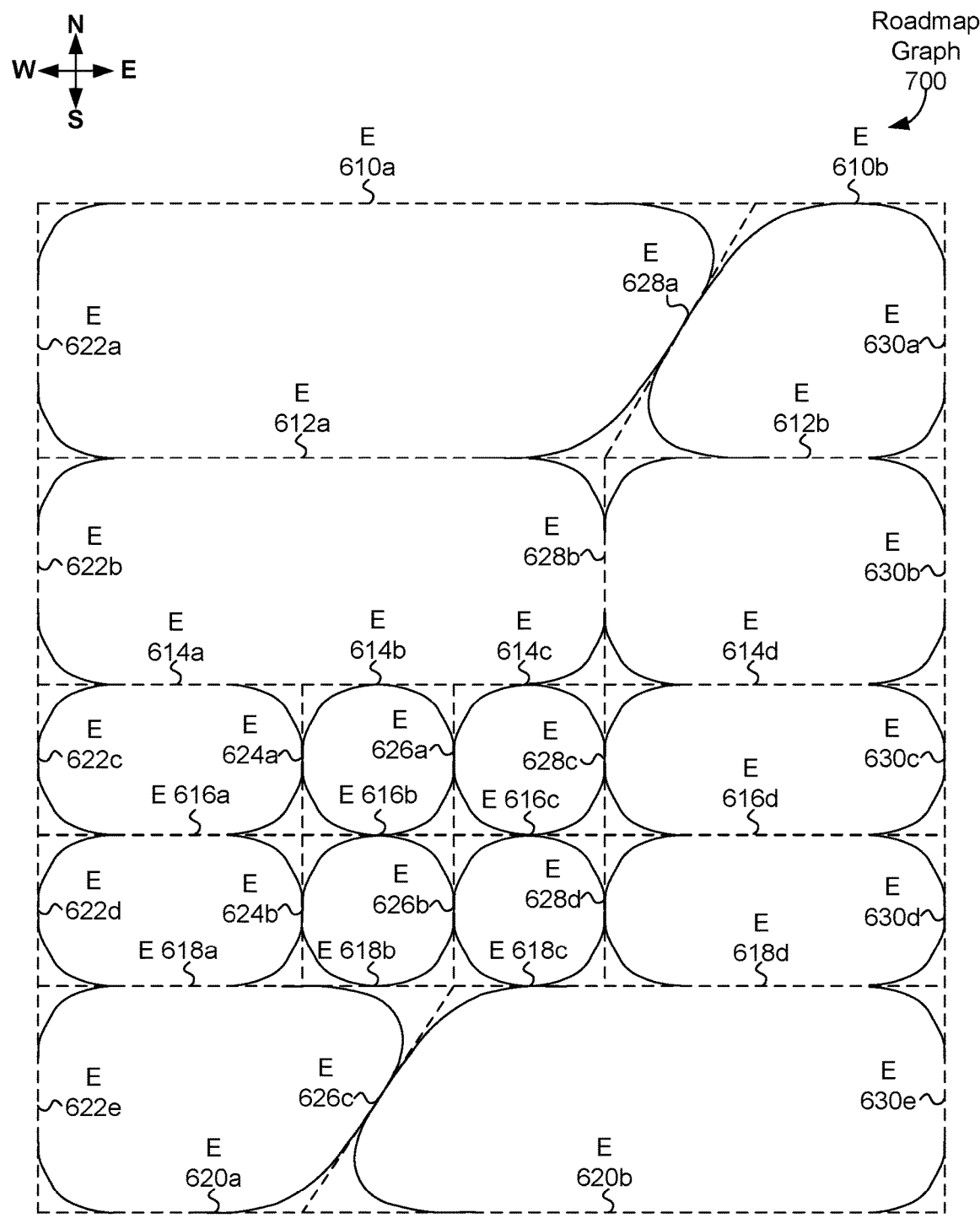
FIG. 7 depicts a roadmap graph corresponding to the prototype graph of FIG. 6, in accordance with an example embodiment.

FIG. 7 depicts roadmap graph 700 corresponding to prototype graph 600, in accordance with an example embodiment. Robotic devices can travel an environment mapped using roadmap graph 700 using routes or paths that allow various horizontal translations, vertical translations, and rotations by taking one or more edges and/or track transition curves, where the track transition curves may have different orientations (e.g., horizontal-to-vertical or vertical-to-horizontal).

In particular, roadmap graph 700 maps the same environment mapped by prototype graph 600 where the intersections of prototype graph 600 have been replaced by transition curves in roadmap graph 700. As such, roadmap graph 700 indicates that a wide variety, if not all, intersections in a roadmap, such as prototype graph 600, can be replaced by transition curves. A robotic device using paths specified using roadmap graph 700 can take one or more transition curves of roadmap graph 700 to reduce the time to stop at and/or slowing down for intersections, such intersections 632-678 of prototype graph 600. Thus, by reducing the time to stop and/or slow down at intersections, a robotic device following paths specified in terms of roadmap graph 700 can be more efficient that a similar robotic device following paths specified in terms of prototype graph 600.

One technique for generating a roadmap graph from a prototype graph can involve taking actions 1-3 below:

1. Each intersection of the prototype graph can be classified as either a simple intersection or a compound intersection. A simple intersection can connect two or more prototype edges at a single point with ample space to return to the path on either side without colliding with an adjacent edge A compound intersection can jointly consider two or more simple intersections that are too close together to allow all edge pairs to feasibly connect their edges independently.

2. Each simple intersection of the prototype graph can be replaced by a pair of Euler spiral segments per roadmap graph edge pair as illustrated in FIG. 8A.

3. Each compound intersection of the prototype graph can be replaced by up to four spiral segments per roadmap graph edge pair as illustrated in FIG. 8B.

FIG. 8A illustrates simple intersection 800, in accordance with an example embodiment. Simple intersection 800 includes prototype graph edges (PGEs) 810, 814, and 816 coming together at point 812. For simple intersection 800, point 812 and part or all of prototype graph edges 810, 814, and 816 can be replaced by two roadmap graph edges (RGEs) 820 and 822. In both FIGS. 8A and 8B, prototype graph edges are shown using solid line and roadmap graph edges are shown using dashed lines.

More specifically, the turn indicated by first taking prototype graph edge 810 into point 812 and taking prototype graph edge 814 can be replaced by roadmap graph edge 820, and the turn indicated by first taking prototype graph edge 810 into point 812 and taking prototype graph edge 816 can be replaced by roadmap graph edge 822. Each of roadmap graph edges 820 and 822 can be a track transition curve, at least a portion of which can be an Euler spiral. In some embodiments, each of roadmap graph edges 820 and 822 can have three segments: a first segment that includes a straight line, a second segment that includes a portion of an Euler spiral, and a third segment that includes a straight line. As such, the pair of roadmap graph edges 820 and 822 can include two Euler spiral segments.

FIG. 8B illustrates compound intersection 850, in accordance with an example embodiment. Compound intersection 850 includes prototype graph edges 860, 862, and 864 coming together at point 870 and prototype graph edges 864, 866, and 868 coming together at point 872. For compound intersection 850, points 870 and 872 and at least portions of prototype graph edges 860, 862, 864, 866, and 868 can be replaced by two roadmap graph edges 880 and 882.

More specifically, roadmap graph edge 880 can replace the turns indicated by first taking prototype graph edge 860 into point 870, subsequently taking prototype graph edge 864 from point 870 to point 872, and then taking prototype graph edge 868 from point 872. Also, roadmap graph edge 882 can replace the turns indicated by first taking prototype graph edge 862 into point 870, subsequently taking prototype graph edge 864 from point 870 to point 872, and then taking prototype graph edge 866 from point 872.

Each of roadmap graph edges 880 and 882 can include one or more track transition curves, and at least two portions of each of roadmap graph edges 880 and 882 can be an Euler spirals. As such, the pair of roadmap graph edges 880 and 882 can have four Euler spiral segments. For example, each of roadmap graph edges 880 and 882 can have at least four segments: a first segment that includes a straight line, a second segment that includes a portion of an Euler spiral, a third segment that includes another portion of an Euler spiral, and a fourth segment that includes a straight line. In particular of these embodiments, the second and third (Euler spiral) segments of roadmap graph edges 880 and/or 882 can be separated by one or more straight line segments.

A roadmap or roadmap graph can be validated. Validation can verify that an agent, such as a robotic device, can travel between all location pairs in the roadmap or roadmap graph without colliding into one or more fixed obstacles. A validation process for roadmaps or roadmap graphs usable by robotic devices operating in a warehouse environment having one or more operational locations, such as locations of pallets loaded with material, charging stations, loading docks, doors, fixed obstacles, and other locations of interest, can include the following actions 1-4:

1. A determination can be made that a prototype graph associated with the roadmap or roadmap graph is fully connected. If the prototype graph is not fully connected, the validation process can fail.

2. A determination can be made whether each intersection in the prototype graph or roadmap graph has at least one in-bound and at least one out-bound edge. If an intersection of the prototype graph does not have at least one in-bound and at least one out-bound edge, the validation process can fail.

3. A determination can be made that each of one or more operational locations in the environment are accessible. For example, an operational location associated with a pallet can be determined to be accessible if the pallet can be picked up by a robotic device or other agent. In some embodiments related to this example, pallets can be assumed to be picked from only one side, which implies that there must be a roadmap graph edge in front of the pallet. If one or more operational locations in the environment are not accessible, the validation process can fail.

4. A determination can be made that generated paths do not collide with one or more obstacles, such as obstacles discussed in the context of obstacle detection subsystem 134. If one or more generated paths do collide with one or more obstacles, the validation process can fail. Collisions between paths and obstacles can be verified by sweeping the robot's footprint along the path as indicated by FIG. 9.

FIG. 9 shows aspects of validating roadmap graph 900, in accordance with an example embodiment. An environment modeled by roadmap graph 900 includes pallets 910, 912, 914, and 916. FIG. 9 shows that a prototype graph with prototype graph edges 920, 922, 924, 926, and intersections 930 and 932 has been generated for the environment. Also, roadmap graph 900 includes roadmap graph edge 928 has been generated based on prototype graph edges 920-926 and intersections 930 and 932.

Following action 1 of the validation process described above, a determination is made that the prototype graph associated with roadmap graph 900 is not fully connected, as prototype graph edge 926 is not connected to prototype graph edges 920, 922, and 924, and intersections 930 and 932. As the prototype graph associated with roadmap graph 900 is not fully connected, action 1 of the validation process indicates that roadmap graph 900 is not validated.

Following action 2 of the validation process described above, a determination is made that intersection 926 has two out-bound edges (prototype graph edges 920 and 922), but does not have an in-bound edge. As intersection 926 does not have both in-bound and out-bound edges, action 2 of the validation process indicates that roadmap graph 900 is not validated.

Following action 3 of the validation process described above, a determination is made that there is no roadmap graph edge in front of pallet 916 as illustrated by FIG. 9. As pallet 916 is not accessible by roadmap graph 900, action 3 of the validation process indicates that roadmap graph 900 is not validated.

To follow action 4 of the validation process described above, footprints 940 and 942 are examples of footprints of a robotic device being swept along roadmap graph edge 928. As indicated in FIG. 9, when footprint 940 is swept along roadmap graph edge 928, footprint 940 collides with pallet 914 at collision point 944. As footprint 940 swept along roadmap graph edge 928 collides with pallet 914, then at least one footprint collides with at least one pallet along a generated roadmap graph edge. Therefore, action 4 of the validation process indicates that roadmap graph 900 is not validated.

In some embodiments, a roadmap graph can be determined using a roadmap graph generator. In particular of these embodiments, part or all of the above-mentioned validation process can be encoded into the roadmap graph generator: For example, when the roadmap graph generator is generating track transition curves, the roadmap graph generator can select a curvature parameter related to the roadmap graph generator an intersection that is traversable quickly without causing collisions.

A roadmap graph can be considered as a set of continuous, connected curves. However, many multi-agent planning formulations assume a discrete formulation; i.e., navigation is over a "grid world" representable by a discrete graph with uniform edge weights and uniform time steps. To satisfy the grid world assumption, continuous roadmap graphs can be converted to discrete planning graphs. Once a continuous roadmap graph is converted to a discrete planning graph, a discrete planner can operate on the discrete planning graph to solve the multi-agent planning problem; i.e., coordinate robotic devices operating in an environment. In some embodiments, the discrete planner can use a greedy algorithm to attempt to move a designated agent along a shortest path toward the designated agent's goal while removing obstacles and/or other agents from the designated agent's path.

A continuous roadmap graphs can be converted to above-mentioned discrete planning graph representation generated by discretizing each edge (or path) of the roadmap so that each resulting discretized edge (or path) segment has a substantially uniform cost for each edge (or path). That is, edges (or paths) in the roadmap graph can be prepared by sampling edges (or paths) of uniform length with respect to some cost parametrization.

Then, each discretized edge (or path) segment of the roadmap graph can be treated as, and so correspond to, a state (or node) in the discrete planning graph. As such, the discrete planning graph can include a plurality of states, where each state in the discrete planning graph can correspond to a discretized edge (or path) segment of the roadmap, and states of the discrete planning graph can be connected by edges of the discrete planning graph in accord with connectivity between edge (or path) segments of the roadmap. Edges in the discrete planning graph then correspond to adjacent and connected discretized edge (or path) segments of the roadmap graph.

In some embodiments, the roadmap graph can be sparsified, which can involve removing any intersections that may exist as artifacts of construction such that every path connecting intersections is as long and contiguous as possible, prior to discretization. In particular of these embodiments, discretizing a roadmap graph can include sparsification; i.e., removing one or more intersections of the roadmap graph prior to discretization.

The resulting discrete planning graph can have substantially uniform edge costs and substantially uniform time steps. One or more edge costs (or time steps) can be considered to be substantially uniform, with a substantially uniform value of EV1 if each of the edge costs (or time steps) is within the range [EV2, EV3], where EV2=EV1−t1, EV2=EV1+t1, and t1 is a predetermined value; e.g., let EV1=1 and t1=0.1, then the one or more edge costs (or time steps) are substantially uniform if each edge cost (or time step) is within the range of [0.9, 1.1].

Figures 10A, 10B:
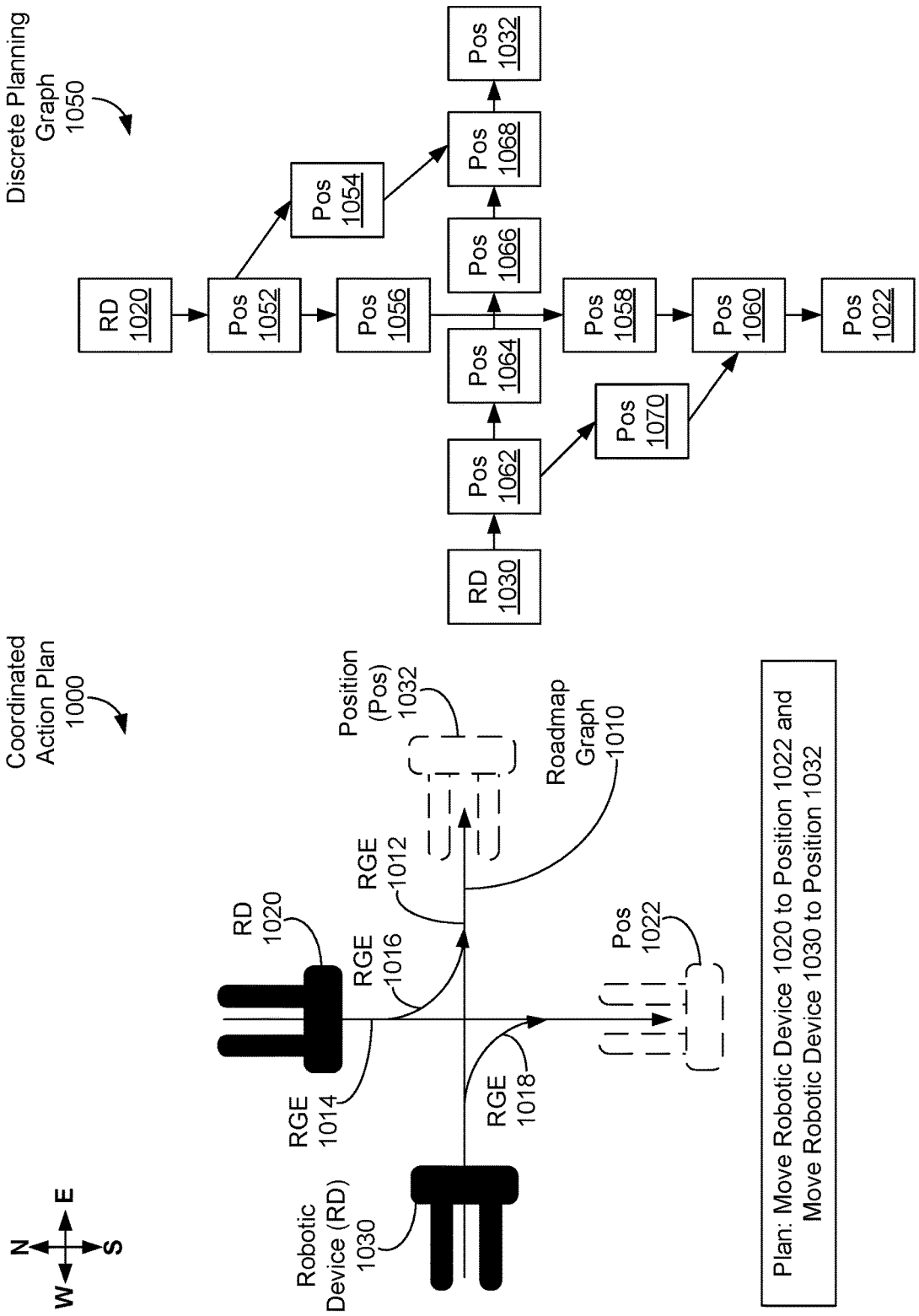
FIG. 10A shows a coordinated action plan, in accordance with an example embodiment.
FIG. 10B shows a discrete graph related to the coordinated action plan of FIG. 10A, in accordance with an example embodiment.

FIG. 10A shows coordinated action plan 1000, in accordance with an example embodiment. Coordinated action plan 1000 involves moving two robotic devices (RDs) 1020 and 1030 from their respective current/starting positions to their respective desired/ending positions 1022 and 1032. To carry out coordinated action plan 1000, robotic devices 1020 and 1030 can follow pathways described by roadmap graph 1010 that includes roadmap graph edges 1012, 1014, 1016, and 1018 as shown in FIG. 10A.

FIG. 10B shows discrete planning graph 1050 related to coordinated action plan 1000, in accordance with an example embodiment. Discrete planning graph 1050 is a discretized version of roadmap graph 1010 where states of discrete planning graph 1050 represent discretized edge segments of a discretized version of roadmap graph 1010, and where edges of discrete planning graph connect states of discrete planning graph 1050 based on connectivity of discretized edge segments in the discretized version of roadmap graph 1010. Then, each state of discrete planning graph 1050 can correspond to one or more positions in coordinated action plan 1000.

The discretized edge segments for the discretized version of roadmap graph 1010 can be associated with costs that are substantially uniform according to a cost function. The cost function can be based on one or more cost parameters, such as a time parameter, a length parameter, and/or a work-related parameter. For example, one cost function can determines a cost of an edge based on one or more cost parameters representing: length(s) of the edge(s), amount(s) of time one or more robotic devices (and/or other agents) are expected to take to traverse the edge, and an amount of work or power, such as battery power, expended to traverse the edge. In some embodiments, the cost function can determine a cost value based on a mathematical combination of values of the cost parameters; e.g., add, multiply, scale, average, perform a weighted average, and/or apply other mathematical techniques to the cost parameter(s) to determine the cost value.

For example, west-to-east roadmap graph edge 1012 of roadmap graph 1010 can have two states associated with positions 1030 and 1032. In discrete planning graph 1050, roadmap graph edge 1012 has been discretized into six states connected by five related edges. FIG. 10B shows these six states, from west to east, representing positions 1030, 1062, 1064, 1066, 1068, and 1032, and the five related edges travel: (1) from the state for position 1030 to a state for position 1062, (2) from the state for position 1062 to a state for position 1064, (3) from the state for position 1064 to a state for position 1066, (4) from the state for position 1066 to a state for position 1068, and (5) from the state for position 1068 to the state for position 1032. As another example, north-to-south roadmap graph edge 1014 of roadmap graph 1010 has two states associated with positions 1020 and 1022. In discrete planning graph 1050, roadmap graph edge 1014 has been discretized into six states connected by five related edges. FIG. 10B shows these six states, from north to south, representing positions 1020, 1052, 1056, 1058, 1060, and 1022, and the five related edges travel: (1) from the state for position 1020 to a state for position 1052, (2) from the state for position 1052 to a state for position 1056, (3) from the state for position 1056 to a state for position 1058, (4) from the state for position 1058 to a state for position 1060, and (5) from the state for position 1060 to the state for position 1022.

Discrete planning graph 1050 also includes representations of curved roadmap graph edges 1016 and 1018. FIG. 10B shows that roadmap graph edge 1016 has been discretized into three states connected by two edges that travel: (1) from the state for position 1052 to a state for position 1054 and (2) from the state for position 1054 to the state for position 1068. FIG. 10B also shows that roadmap graph edge 1018 has been discretized into three states connected by two edges that travel: (1) from the state for position 1062 to a state for position 1070 and (2) from the state for position 1070 to position 1060. FIGS. 10A and 10B show that roadmap graph 1010 and discrete planning graph 1050 have directed edges; in other embodiments, roadmap graphs and/or discrete planning graphs can use undirected edges.

In some embodiments, coordinated action plan 1000 and/or discrete planning graph 1050 can relate poses rather than, or along with, positions. That is each of positions 1020, 1022, 1030, 1032, 1052, 1054, 1056, 1058, 1060, 1062, 1064, 1066, 1068, and 1070 can be represented by respective poses 1020, 1022, 1030, 1032, 1052, 1054, 1056, 1058, 1060, 1062, 1064, 1066, 1068, and 1070, as a location of each respective pose can be the respective position, and an orientation of each respective pose can be determined based on the respective position; e.g., based on an orientation of an incoming or departing edge to the pose. Then, the respective states of discrete planning graph 1050 associated with positions 1020, 1022, 1030, 1032, 1052, 1054, 1056, 1058, 1060, 1062, 1064, 1066, 1068, and 1070 can be associated with the respective corresponding poses.

A multi agent planning formulation can assume that a configuration of agents, such as robotic devices is valid if the configuration does not place multiple agents in the same location, position, or cell at the same time. In some examples, such as examples with relatively large agent sizes, this validity determination for agent configurations may not be feasible. In these examples, validity can be determined based on mutual exclusion zones corresponding to each agent. For each pair of states in the discrete planning graph, a polygonal footprint representing the agent, perhaps padded with additional space for safety purposes, is swept along the discretized edge (or path) segments corresponding to the pair of states. Then, an agent configuration can be determined to be valid if the swept footprints do not collide. In some embodiments, the footprints of the agents in the configuration of agents can be homogeneous; i.e., each agent's foot print can be the same. In other embodiments, two or more footprints can be used for the agents in the configuration of agents.

A Boolean equation can be generated that represents a valid configuration of agents based on a discrete planning graph, such as discrete planning graph 1050. The Boolean equation can include one or more Boolean (binary) decision variables. A Boolean variable can be created for each valid transition from intersection x to y in the discrete planning graph, at each time step t and for each agent a. Such a Boolean variable can have a TRUE value to indicate that an agent a travels from intersection x to y at time step t and a FALSE value otherwise. Stationary edges can be added so each intersection is connected to itself at time t+1. Additional layers can be added around the first and last time steps to allow for some flexibility in start and goal restrictions.

The Boolean equation can include three types of Boolean clauses for constraining the agent configuration problem: start and goal clauses, flow conservation clauses, and collision clauses. Start and goal clauses can be unitary clauses that force the variable connecting a goal state and a start state for each agent to be TRUE. Flow conservation clauses can ensure continuity of agent travel by having an equal number of true input variables and output variables. Collision clauses can ensure the mutual exclusion constraints contained in a conflict matrix are respected by adding a (NOT a OR NOT b) clause for each pair (a, b) of conflicting discretized edge (or path) segments of discrete planning graph 1050.

The conflict matrix can represent conflicts, such as collisions, possible collisions and/or possible near collisions, between agents/robotic devices in the environment. For example, the conflict matrix can be an N×N matrix, where N=the total number of discretized path segments. Then, an entry (x, y) in the conflict matrix, $1 \le x \le N$, $1 \le y \le N$, can be set either to a value of 1 (or, in some embodiments, TRUE) if a robotic device on discretized path segment x is in conflict with a robotic device on discretized path segment y; or to a value of 0 (or, in some embodiments, FALSE) if a robotic device on discretized path segment x is not in conflict with a robotic device on discretized path segment y. Other representations of the conflict matrix are possible as well.

This formulation of the Boolean equation can assume that each agent has a unique destination; however, multiple agents can be treated as indistinguishable by letting them share the same set of variables. In some embodiments, the Boolean equation can be a conjunctive normal form (CNF) Boolean equation. Once the Boolean equation has been generated, the Boolean equation can be provided to a SAT solver to solve the Boolean equation.

Figure 11:
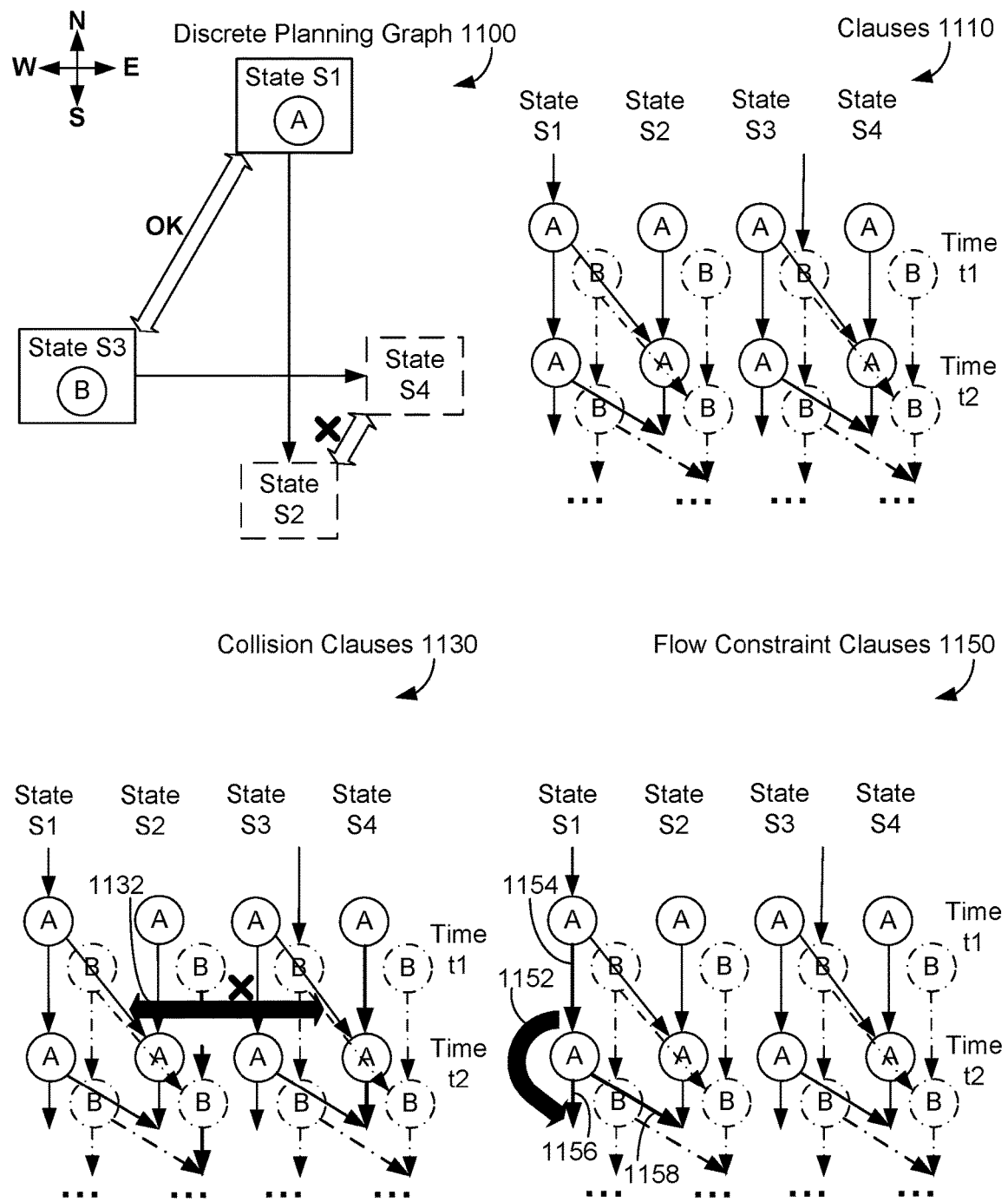
FIG. 11 shows a discrete planning graph, a graphical depiction of a set of clauses, a graphical depiction of a set of collision clauses, and a graphical depiction of a set of flow constraint clauses, in accordance with an example embodiment.

FIG. 11 shows a discrete planning graph 1100, a graphical depiction of a set of clauses 1110, a graphical depiction of a set of collision clauses 1130, and a graphical depiction of a set of flow constraint clauses 1150, in accordance with an example embodiment. Each of discrete planning graph 1100, clauses 1110, collision clauses 1130, and flow constraint clauses 1150 relate to agents/robotic devices A and B. Discrete planning graph 1100 shows that robotic device A is at a state S1 that represents a location in an environment and is planning to go to state S2 that represents a location in the environment to the south of the location corresponding to state S1 and that robotic device B is at a state S3 that represents a location in an environment and is planning to go to state S4 that represents a location in the environment to the east of the location corresponding to state S3. Discrete planning graph 1100 includes a double arrow with an "OK" label between states S1 and S3 to show that robotic device A starting at state S1 and robotic device B starting at state S3 is "OK". Discrete planning graph 1100 includes a double arrow with an "X" label between states S2 and S4 to show that a collision may occur if robotic device A arrives at state S2 at the same time that robotic device arrives at state S4.

Clauses 1110 specify relationships between robotic devices A and B, states or locations of robotic devices A and B, and time, where clauses 1110 are based on discrete planning graph 1100. In particular, FIG. 11 shows aspects of clauses 1110, collision clauses 1130, and flow constraint clauses 1150 with solid arrows and circles related to clauses specifying relationships relating to robotic device A of discrete planning graph 1100 and with dashed-and-dotted lines and circles related to clauses specifying relationships relating to robotic device B of discrete planning graph 1100. In some examples, robotic device A and robotic device B are both the same type; e.g., both robotic devices are the same model made by the same manufacturer and/or both robotic devices have the same footprint. In other examples, robotic device A and robotic device B can be robotic devices having different types; in these examples, a Boolean equation representing at least a portion of discrete planning graph 1100 can include one or more clauses for each type the robotic devices.

For clauses 1110, collision clauses 1130, and flow constraint clauses 1150, lettered circles represent a robotic device; e.g., a circle around the letter A represents robotic device A, and a circle around the letter B represents robotic device B. Two times—times t1 and t2—are represented by clauses 1110, collision clauses 1130, and flow constraint clauses 1150 with time t1 being specified in an upper portion of each of clauses 1110, collision clauses 1130, and flow constraint clauses 1150 and time t2 being specified in a lower portion of each of clauses 1110, collision clauses 1130, and flow constraint clauses 1150. Four states are represented by clauses 1110, collision clauses 1130, and flow constraint clauses 1150—these states are states/locations S1, S2, S3, and S4 shown in discrete planning graph 1100.

Arrows of clauses 1110, collision clauses 1130, and flow constraint clauses 1150 represent transitions between states in time, with initial conditions being specified by arrows into lettered circles (representing robotic devices) at time t1. For example, the arrow pointing downward to the lettered circle A at state S1 and time t1 in each of clauses 1110, collision clauses 1130, and flow constraint clauses 1150 indicates an initial condition that robotic device A is at state S1 at time t1. Also, the arrow pointing downward to the lettered circle B at state S3 and time t1 in each of clauses 1110, collision clauses 1130, and flow constraint clauses 1150 indicates an initial condition that robotic device B is at state S3 at time t1. Then, the arrows from the lettered circle A at state S1 to lettered circles A at respective states S1 and S2 in each of clauses 1110, collision clauses 1130, and flow constraint clauses 1150 indicate that robotic device A at state S1 can travel to either state S1 or state S2 between time t1 and time t2. Also, the arrows from the lettered circle B at state S3 to lettered circles B at respective states S3 and S4 in each of clauses 1110, collision clauses 1130, and flow constraint clauses 1150 indicate that robotic device B at state S3 can travel to either state S3 or state S4 between time t1 and time t2.

Boolean clauses can represent the relationships expressed graphically by clauses 1110, collision clauses 1130, and flow constraint clauses 1150 in FIG. 11. For example, let:

$A\_S1\_t1$, $A\_S1\_t2$, $A\_S2\_t2$, $B\_S3\_t1$, $B\_S3\_t2$, and $B\_S4\_t2$ be Boolean variables, where $A\_S1\_t1$ has a TRUE value if robotic device A is at state S1 at time t1, and has a FALSE value otherwise;

$A\_S1\_t2$ has a TRUE value if robotic device A is at state S1 at time t2, and has a FALSE value otherwise;

$A\_S2\_t2$ has a TRUE value if robotic device A is at state S2 at time t2, and has a FALSE value otherwise;

$B\_S3\_t1$ has a TRUE value if robotic device B is at state S3 at time t1, and has a FALSE value otherwise;

$B\_S3\_t2$ has a TRUE value if robotic device B is at state S3 at time t2, and has a FALSE value otherwise; and $B\_S4\_t2$ has a TRUE value if robotic device B is at state S4 at time t2, and has a FALSE value otherwise.

Then, as shown in each of clauses 1110, collision clauses 1130, and flow constraint clauses 1150, arrows into and out of the lettered circle A from state S1 indicate that robotic device A is at state S1 at time t1 and indicate that robotic device A at state S1 can travel to either state S1 or state S2 between time t1 and time t2. These aspects of robotic device A can be expressed as Boolean clauses such as: ($A\_S1\_t1$ AND [$A\_S1\_t2$ OR $A\_S2\_t2$]). And, as shown in each of clauses 1110, collision clauses 1130, and flow constraint clauses 1150, arrows into and out of the lettered circle B from state S3 that indicate that robotic device B is at state S3 at time t1 and indicate robotic device B at state S3 can travel to either state S3 or state S4 between time t1 and time t2. These aspects of robotic device B can be expressed as Boolean clauses such as: ($B\_S3\_t1$ AND [$B\_S3\_t2$ OR $B\_S4\_t2$]).

These two sets of Boolean clauses can be combined using an AND operator to express relationships for both robotic devices A and B; e.g., {[$A\_S1\_t1$ AND ($A\_S1\_t2$ OR $A\_S2\_t2$)] AND [$B\_S3\_t1$ AND ($B\_S3\_t2$ OR $B\_S4\_t2$)]}.

Similar clauses also can be generated for the relationships graphically expressed by clauses 1110 for robotic device A being at either state S2, state S3, or state S4 at time t1 and at any one of states S1, S2, S3, and S4 at time t2 and/or for the relationships expressed by clauses 1110 for robotic device B being at either state S1, state S2, or state S4 at time t1 and at any one of states S1, S2, S3, and S4 at time t2.

Collision clauses 1130 can be used to simultaneously plan non-conflicting routes for at least robotic devices A and B. That is, collision clauses 1130 can specify relationships related to collisions, such as collisions between robotic devices A and B in the context that collision clauses 1130 are based on discrete planning graph 1100. In particular, discrete planning graph 1100 shows a possible collision between robotic devices A and B if robotic device A arrives at state S2 at the same time that robotic device B arrives at state S4.

More specifically, collision clauses 1130 include double arrow 1132 with an "X" label indicating that if robotic device A travels from state S1 to state S2 at time t2, then robotic device B cannot travel from travel from state S3 to state S4 at time t2 without an ensuing collision. Similarly, double arrow 1132 indicates that if robotic device B travels from state S3 to state S4 at time t2, then robotic device A cannot travel from travel from state S1 to state S2 at time t2 without an ensuing collision. Also, a collision can be avoided if both robotic devices A and B stay in respective states S1 and S3 at time t2.

The conditions related to collisions shown by collision clauses 1130 can be expressed using the Boolean variables mentioned above in the context of clauses 1110 as follows:

[(NOT A_S2_t2) OR (NOT B_S4_t2)]

These Boolean clauses express a condition that a collision will not occur if: robotic device A does not travel to state S2 at time t2 OR robotic device B does not travel to state S4 at time t2.

In some embodiments, collision clauses 1130 can be generated after sweeping a footprint across edges (or paths or path segments) in a discrete planning graph/discretized roadmap and determining a conflict/intersection between swept edges occurs, such as discussed above in the context of FIG. 10B. Then, a collision clause of collision clauses 1130 can be generated if one robotic device can travel along one of the edges (or paths or path segments that makes up the intersection between swept edges (or paths or path segments) and a different robotic device can travel along a different one of the (or paths or path segments) that makes up the intersection between of swept edges (or paths or path segments) at the same time.

Flow constraint clauses 1150 can specify relationships continuity of agent travel by having an equal number of true input variables and true output variables, such as flow constraints on robotic devices A and B based on discrete planning graph 1100. True input variables can specify where robotic devices are at an initial time and true output variables can specify where robotic devices are at a later time that is after the initial time; e.g, one or more time steps later than the initial time. In the context of discrete planning graph 1100 and flow constraint clauses 1150, two time steps are shown—an initial time step of time t1 and a later time step of time t2.

Using the Boolean variables mentioned above in the context of clauses 1110, discrete planning graph 1100 and flow constraint clauses 1150 show that two input variables will be true: A_S1_t1 and B_S3_t1. Regarding robotic device A, FIG. 11 includes thick arrow 1152, representing a flow constraint clause, indicates that one of arrow 1156, indicating that robotic device A is at state S1 at time t2, and arrow 1158, indicating that robotic device A is at state S2 at time t2, represents a true condition. That is, the flow constraint clause represented by thick arrow 1152 can specify that one and only one of Boolean variables A_S1_t2 and A_S2_t2 is true. Similarly, a flow constraint clause regarding robotic device B can indicate that either robotic device B is at state S3 at time t2 or robotic device B is at state S4 at time t2; that is, the flow constraint clause regarding robotic device B can specify that one and only one of Boolean variables B_S3_t2 and B_S4_t2 is true.

The conditions related to the flow constraint clauses for robotic devices A and B shown can be expressed as follows:

{[A_S1_t2 AND (NOT A_S2_t2)] OR [(NOT A_S1_t2) AND A_S2_t2]} to express the flow constraint that one and only one of Boolean variables A_S1_t2 and A_S2_t2 is true, and S{[B_S3_t2 AND (NOT B_S4_t2)] OR [(NOT B_S3_t2) AND B_S4_t2]} to express the flow constraint that one and only one of Boolean variables A_S1_t2 and A_S2_t2 is true, These Boolean flow constraint clauses can be joined by OR statements to indicate that both flow constraints are to be satisfied as follows:

({[A_S1_t2 AND (NOT A_S2_t2)] OR [(NOT A_S1_t2) AND A_S2_t2]} OR {[B_S3_t2 AND (NOT B_S4_t2)] OR [(NOT B_S3_t2) AND B_S4_t2]})

Boolean clauses, such as, but not limited to, Boolean clauses based on clauses 1110, collision clauses 1130, and/or flow constraint clauses 1150, can be joined together to form a Boolean equation. In some embodiments, the resulting Boolean equation can be expressed in Conjunctive Normal Form, that is as a conjunction of clauses; i.e., an AND of one or more Boolean clauses expressed using OR operators.

Another technique for determining Boolean clauses can include using a binary encoding for identifiers for robotic devices (e.g., 00 for robotic device A and 01 for robotic device B), and encoding Boolean constraints in terms of equality of the IDs. In some embodiments of this technique, the resulting number of variables in the Boolean equation can be based on having a layer of clauses whose size is proportional to $\log_2$(number of agents)(the number of binary digits required to represent the set of possible agents) per timestep per node. Other expressions of clauses 1110, collision clauses 1130, and/or flow constraint clauses 1150 are possible as well.

The Boolean equation discussed above that includes clauses, collision clauses, and flow constraint clauses and which may be in Conjunctive Normal Form Boolean, can be provided to a SAT solver for solution. The output of the SAT solver can be a set of values for the Boolean variables of the Boolean equation that satisfy the Boolean equation or an indication that the Boolean equation cannot be solved. When available, the set of values for the Boolean variables of the Boolean equation that satisfy the Boolean equation can be considered as a sequence of states of a discrete planning graph; e.g., discrete planning graph 1100. For example, according to discrete planning graph 1100, Boolean variables A_S1_t1 and B_S3_t1 are initialized to be TRUE, and if the SAT solver determined that Boolean variables A_S1_t2 and B_S4_t2 are also TRUE, a sequence of states represented by these true Boolean variables can be State S1: occupied by robotic device A at times t1 and t2, State S2: unoccupied at times t1 and t2, State S3: occupied by robotic device B at time t1 and unoccupied at time t2; and State S4: unoccupied at time t1 and occupied by robotic device B at time t2. Many other sequences of states, discrete planning graphs, and representations of sequences of states are possible as well.

In cases where the SAT solver outputs a set of values for the Boolean variables of the Boolean equation, the values of the Boolean equation can yield a set of discrete planning edges for each agent. Continuing the example of robotic devices A and B and related Boolean values discussed above, if both of the Boolean variables B_S3_t1 and B_S4_t2 are true, then robotic device B started in state S3 at time t1 and ended in state S4 at time t2. Thus, an edge in a discrete planning graph between states S3 and S4 can be associated with robotic device B for the interval between time t1 and time t2.

As another example, one or more numerical values can be determined based on the Boolean variables, and those numerical values can be used to determine a set of discrete planning edges for each agent. Continuing the example of robotic devices A and B and related Boolean values discussed above, suppose that robotic device A is guaranteed to be at state S1 at time t1, as indicated by discrete planning graph 1100. Then, two of the following five Boolean variables can be true: A_S1_t1, which must be TRUE, and one of the following Boolean variables: A_S1_t2, A_S2_t2, A_S3_t2, and A_S4_t2. Also, let TRUE Boolean values correspond to a numerical value of 1, and FALSE Boolean values correspond to a numerical value of 0. Then, a numerical value for robotic device V(A) can determined as follows: $A\_S1\_t1*2^4+A\_S1\_t2*2^3+A\_S2\_t2*2^2+A\_S3\_t2*2^1+A\_S4\_t2*2^0$. That is, V(A) can be determined as being considered to be a bit string representing TRUE/1 and FALSE/0 values of the Boolean variables associated with robotic device A. Other techniques for determining a numerical value based on Boolean variables are possible as well.

Since the numerical value according to A_S1_t1 will always be 1 and only one of {A_S1_t2, A_S2_t2, A_S3_t2, A_S4_t2} can be TRUE in this example, V(A) can then have one of four numerical values: (1) 17, when A_S1_t1 and A_S4_t2 are both TRUE; (2) 18, when A_S1_t1 and A_S3_t2 are both TRUE; (3) 20, when A_S1_t1 and A_S2_t2 are both TRUE, and (4) 24, when A_S1_t1 and A_S1_t2 are both TRUE. Then, a lookup table and/or related data can be associated with V(A) to determine a set of discrete planning edges for robotic device A. An example of this lookup table is shown as Table 2 below:

TABLE 2

| V(A) Value | Edges associated with Robotic Device A |
|---|---|
| 17 | An edge from state S1 to state S4 |
| 18 | An edge from state S1 to state S3 |
| 20 | An edge from state S1 to state S2 |
| 24 | An edge from state S1 to state S1 |

Similar techniques can be used to determine a numerical value V(B) associated with robotic device B, and a lookup table and/or related data can be associated with V(B) to determine edges related to robotic device B.

In related examples, the value of A_S1_t1 can be omitted from the determination of V(A) since the value of A_S1_t1 is fixed as TRUE (or 1) since robotic device A always starts in state S1 in this example; then the values of V(A) can be one of 1, 2, 4, or 8. In other related examples, the state of robotic device A may not be fixed in state S1. Then, V(A) can be determined based on eight Boolean variables—four Boolean variables representing the state of robotic device A at time t1 {A_S1_t1, A_S2_t1, A_S3_t1, A_S4_t1} and four Boolean variables representing the state of robotic device A at time t2 {A_S1_t2, A_S2_t2, A_S3_t2, A_S4_t2}. In still other examples, the Boolean variables associated with robotic device at time t2 and Table 2 can be simplified based on edges of the discrete planning graph—as there are no edges from state S1 to either state S3 or state S4, the variables A_S3_t2 and A_S4_t2 should always be false. If A_S3_t2 and A_S4_t2, V(A) as can only take two values: 20 and 24, and so the lookup table associated with V(A) can be simplified to only have the entries for V(A)=20 and V(A)=24 shown above in Table 2. In even other examples, one value can be determined for multiple robotic devices, and one entry of the corresponding lookup table can record multiple edges related to multiple robotic devices. In further other examples, a value can be determined for states of a robotic device over multiple time steps and one entry of the corresponding lookup table can record multiple edges related to the multiple time steps; e.g., an edge from state S1 to state S1 between time steps t1 and t2, an edge from state S1 to state S2 between time steps t2 and t3, etc. Many other representations of values, lookup tables, and related data are possible as well.

The set of discrete planning edges can then be mapped onto a continuous roadmap domain (i.e., a roadmap graph corresponding to the discrete planning graph having the set of discrete planning edges) for consumption by an executor. A list of roadmap graph edges specifying a full path for an agent can be determined along with dependency edges. A dependency edge can be a directed edge between a first point on a first path for a first robotic device and a second point on a second path for a second robotic device, where the first robotic device has to wait at (or behind) the first point on the first path until the second robotic device crosses (or goes past) the second point on the second path. One dependency edge for a path of an agent can be generated for each other agent that the agent shares a conflicting intersection in the discrete planning graph.

Figure 12:
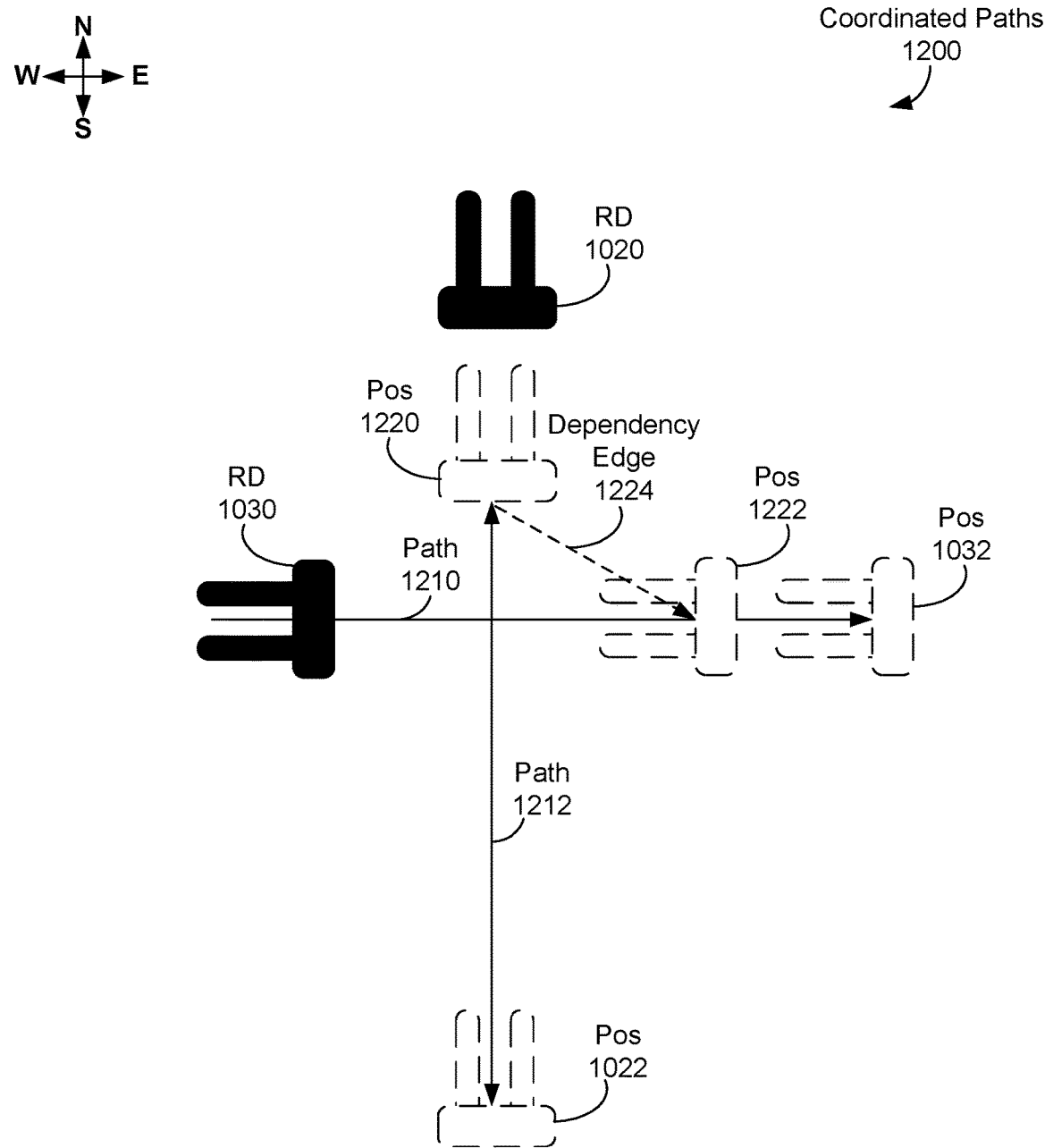
FIG. 12 shows coordinated paths for two robotic devices, in accordance with an example embodiment.

FIG. 12 shows coordinated paths 1200 for two robotic devices 1020 and 1030, in accordance with an example embodiment. Coordinated paths 1200 are based on solving a Boolean equation representing discrete planning graph 1050 shown in FIG. 10B, which in turn represents coordinated action plan 1000 of FIG. 10A.

As shown in FIG. 12, coordinated paths 1200 include path 1210 for robotic device 1030 to reach position 1032, path 1212 for robotic device 1020 to reach position 1022, and dependency edge 1224. Dependency edge 1224 indicates that robotic device 1020 has to wait at position 1220 until robotic device 1030 reaches position 1222 to avoid collisions between robotic devices 1020 and 1030.

In this example, robotic device 1030 can be a blocking device for robotic device 1020, as robotic device 1030 impedes, or blocks, robotic device 1020 from proceeding until blocking robotic device 1030 reaches position 1222. Once robotic device 1030 has reached and/or passed position 1222 on its way along path 1210 to position 1032, robotic device 1020 can then proceed from position 1220 on its way along path 1212 to position 1022.

In some embodiments, a multi-agent planning approach can include an implementation of Windowed Hierarchical Cooperative A* (WHCA*) and or Window SAT. WHCA* can work over multiple levels of abstraction, on both physically realistic and extremely abstract versions of a planning problem, based on its use of "windowed" or fixed-depth searches of a planning solution space. Windowed SAT applies the concept of a windowed search to generation and subsequent solution of Boolean equations; that is, a Boolean equation can be generated based on a windowed search of the planning solution space and the resulting windowed Boolean equation can be solved using a SAT solver.

Coordinated paths with dependency edges that are output based on the Boolean equation solved by a SAT planner can be provided as inputs to an executor. The executor can convert the coordinated paths with dependencies into a set of executable paths that are sent as path commands to each agent. At each of one or more time steps or periods, the executor can monitor progress of each agent along its path and send path commands up to the next unsatisfied dependency. If an agent reaches the end of its path before a blocking agent completes their actions, the agent can stop and wait for a new path.

Figure 13:
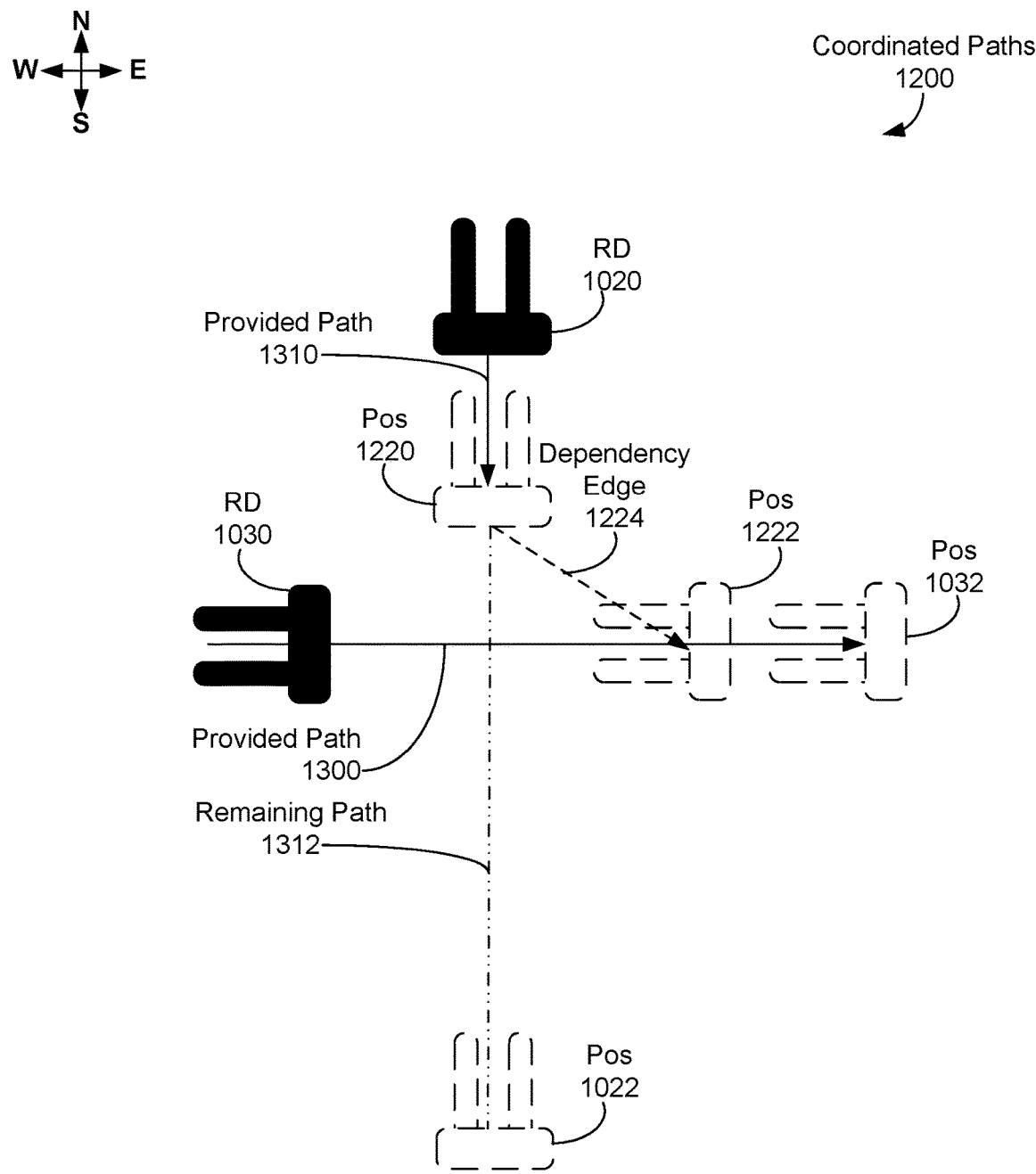
FIG. 13 illustrates execution of the coordinated paths for two robotic devices of FIG. 12, in accordance with an example embodiment.

FIG. 13 illustrates execution of coordinated paths 1200 for two robotic devices 1020 and 1030, in accordance with an example embodiment. Starting at the positions of robotic devices 1020 and 1030 shown in block in FIG. 13, the executor can provide path 1300 to robotic device 1030, where provided path 1300 includes all of path 1210 of FIG. 12. By providing path 1300 to robotic device 1030, the executor can signal to robotic device 1030 that it is free to traverse the entirety of path 1300 without collision. Similarly, the executor can provide path 1310 to robotic device 1020 to signal that robotic device 1020 has to wait at position 1220 to avoid collision; i.e., avoid colliding with robotic device 1030. Once robotic device 1030 reaches and/or passes position 1222, the executor can provide remaining path 1312 to robotic device 1020, which indicates that robotic device 1020 can stop waiting at 1220 and proceed along remaining path 1312 to position 1022. In some embodiments, paths such as path 1300, 1310, and 1312 are provided to robotic devices, such as robotic devices 1020 and 1030, at a relatively-high spatial rate to ensure agents can safely follow paths.

In some scenarios, a robotic device can lose communications with the executor; e.g, due to a loss in wireless connectivity between the executor and the robotic device. Such communication losses can be addressed via ad-hoc networking between the agents to communicate status, an ad-hoc fallback coordination scheme relying on perception of other nearby agents, and/or using other communications techniques.

In some embodiments, coordinated edges 1200 can relate poses rather than, or along with, positions. That is each of positions 1020, 1022, 1030, 1032, 1220, and 1222 can be represented by respective poses 1020, 1022, 1030, 1032, 1220, and 1222, as a location of each respective pose can be the respective position, and an orientation of each respective pose can be determined; e.g., based on an orientation of an incoming or departing edge to the pose.

An onboard planner operating aboard a robotic device can generate one or more trajectories that follow a path as defined in a localized frame of reference, e.g. a reflector-localized reference frame. For example, the localized frame of reference can include a pallet to be picked up, an obstacle to be avoided, open space, a human operator, and/or another robotic device. A path following subsystem of the onboard planner can meet the following conditions:

- A path endpoint attainment precision can be under a predetermined threshold value, such as 0.5 feet, 1 inch, or 1 cm, subject to localization inaccuracies.
- A path following precision should maintain a robotic device within a predetermined threshold value, such as 5 feet, 1 foot, 10 cm, or 1 inch, of a provided path subject to localization inaccuracies
- A traveling speed of a robotic device should be as fast as possible subject to kinematic and safety constraints.

One trajectory generation technique can involve a Dynamic Window Approach (DWA) sampling strategy coupled with a custom quadratic cost function to evaluate candidate trajectories.

Planning system 110, including offboard planner 112 and/or roadmap planner 114, and perhaps other planning systems can be configured to perform a trajectory generation technique. In some embodiments, the trajectory generation technique can generate trajectories based on a planning time interval; i.e., on a periodic basis. Periodic generation of trajectories can ensure continuity between a portion of a prior (previously generated) trajectory traversed during the planning time interval and each new trajectory. In particular of these embodiments, planning time intervals can change due to changes in the environment and/or for other reasons; e.g., planning time intervals can be increased or reduced. In more particular embodiments, a change of the planning time interval can act as a trigger to execute or re-execute the trajectory generation technique.

In embodiments using periodic trajectory generation, an initial pose of a robotic device can include an unmoving robotic device and a stationary prior trajectory. The pose can include other data than position and orientation of at least a portion of a robotic device; e.g., the pose can include one or more trajectories and/or kinematic parameters other than position and orientation, such as velocity and acceleration, associated with the at least the portion of the robotic device; the pose can include a position, orientation, and perhaps other data, such as additional kinematic parameters for an entire robotic device. Then, when a robotic device is in a particular pose, the robotic device can be at a particular position and oriented in a particular orientation (and perhaps has other characteristics) that are associated with the particular pose. A current pose of the robotic device can be an actual pose of the robotic device at a current time; i.e., now. That is, the current pose of the robotic device can be at least an actual position and actual orientation of the robotic device at the current time. Then, trajectories can be generated assuming that the initial pose for trajectory generation is the current pose.

The trajectory generation technique can include some or all of the following actions 1-6:

1. A common frame for all data related to the trajectory can be established. Generated trajectories and odometric data can be specified with respect to an odometric frame, which is a representation of a position, orientation, and/or other kinematic data; e.g., velocity, acceleration for a robotic device based on odometric data for the robotic device. However, paths can be specified based on a path frame, such as a frame based on a map, such as a discrete planning graph, a roadmap graph, and/or a prototype graph. To planning, localization transforms are used to put a path specified in the path frame into the odometric frame and so establish the odometric frame as the common frame for the trajectory. Thus, a path to follow, a prior trajectory, an obstacle cost-map, and perhaps other data all can be specified in terms of the common odometric frame. An obstacle costmap can represent a two-dimensional, three-dimensional or other space as a grid, volume, or other representation, where a cell in the grid, voxel in the volume, etc. is marked if an object, such as an agent, pallet, fixture, and/or other object is at a location represented by the cell, voxel, etc., and the cell, voxel, etc. is unmarked if no object is at the location represented by the cell, voxel, etc. That is, the obstacle costmap records which locations are occupied by an object and which locations are not occupied by an object.

Figure 14A:
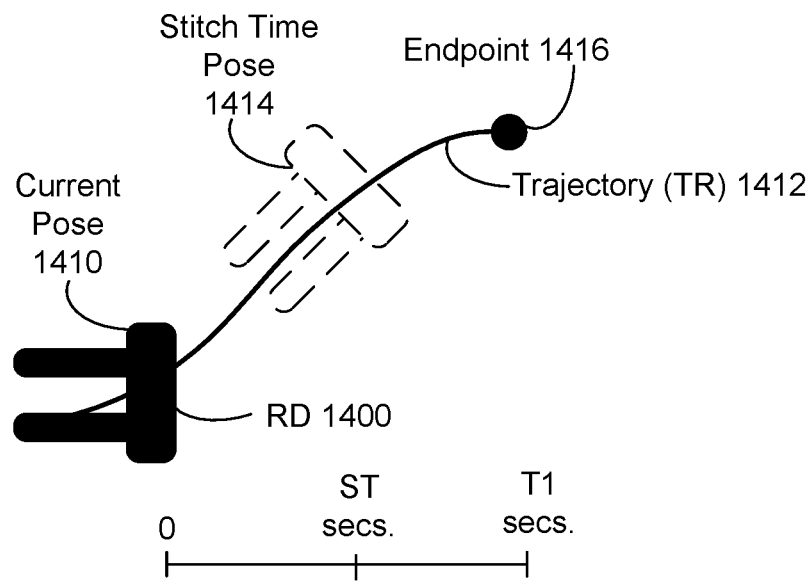
FIG. 14A shows a current pose and a stitch time pose of a robotic device along a trajectory, in accordance with an example embodiment.

2. A robotic device's pose at a stitch time can be determined. FIG. 14A shows current pose 1410 and stitch time pose 1414 of robotic device 1400 along trajectory (TR) 1412, in accordance with an example embodiment. A planner can plan a path or a trajectory for a robotic device, such as trajectory 1412 for robotic device 1400, assuming a known pose of a robotic device, such as a current pose 1410. In other embodiments, a planner can plan a path for the robotic device based on an estimated pose, such as a "stitch time" pose. The stitch time can be sufficiently far in the future to guarantee that the new trajectory will be generated and received by the trajectory follower before the stitch time. A stitch point can be a position of the robotic device at the stitch time.

As illustrated in FIG. 14A, stitch time pose 1414 can an estimated pose of robotic device 1400 at a predefined point in the future called the stitch time. For example, if robotic device 1400 is estimated to take T1 seconds to travel along trajectory 1412 to reach endpoint 1416, then the stitch time ST can be a predetermined fraction; e.g., 20%, 33.33%, 50%, 60% of T1. As another example, stitch time ST can be a predetermined number of seconds; e.g., 0.5, 1, 2, 5. In some particular examples, stitch time ST can be less than or equal to T1 seconds. In some embodiments, a planning time interval can be based on the stitch time; e.g., if the stitch time is ST seconds in the future, the planning time interval can determined to be: ST seconds, a multiple of ST seconds, a sum of a multiple of ST seconds and a constant value, or some other value based on ST. In other embodiments, the planning time interval can be based on the T1 value that robotic device 1400 is estimated to take to travel along trajectory 1412 to reach endpoint 1416; e.g., the planning time interval can determined to be: T1 seconds, a multiple of T1 seconds, a sum of a multiple of T1 seconds and a constant value, or some other value based on T1. Other values and techniques for determining the planning time interval are possible as well.

3. A local path can be obtained. A local path (or local trajectory) can be a portion of the path (or trajectory) that is followed by a robotic device during a planning time interval. For example, a local path (or trajectory) can be a segment of the path (or trajectory) starting at the stitch point; and extending to the farthest point that the robotic device could achieve along the path during the planning time interval.

Figure 14B:
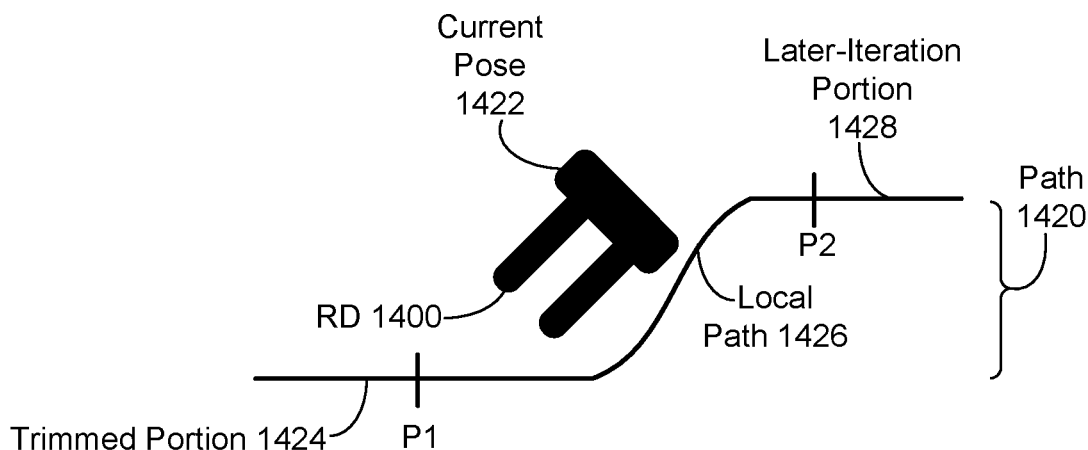
FIG. 14B shows a path for a robotic device in a particular pose, in accordance with an example embodiment.

FIG. 14B shows path 1420 for robotic device 1400 in current pose 1422, in accordance with an example embodiment. Path 1420 includes trimmed portion 1424, local path 1426, and later-iteration portion 1428. Trimmed portion 1424 can be a part or portion of path 1420 that has traversed by robotic device 1400 during one or more previous planning time intervals. Local path 1426 can be a portion of path 1420 followed by robotic device 1400 during a planning time interval. In the example shown in FIG. 14B, local path 1426 starts at a point P1 and ends at a point P2, where current pose 1422 of robotic device 1400 is above local path 1426 between and indicates robotic device 1400 is generally oriented in a direction of local path 1426. Later-iteration portion 1428 can be a part or portion of path 1420 that is expected to be traversed by robotic device 1400 during one or more future planning time intervals.

4. The local path can be trimmed as necessary. The local path for a robotic device can be trimmed, or truncated, to account for any obstacles. Obstacles can be represented using an obstacle costmap. The obstacle costmap can be a two-dimensional grid or three-dimensional discretized volume that tracks whether or not each grid cell or voxel in the discretized volume is occupied by at least one obstacle in an environment that includes the robotic device. Obstacles represented in the obstacle costmap can be fixed obstacles; e.g., a countertop, a table, a pillar or other structure supporting a building in the environment, and/or movable obstacles; e.g., a pallet, another robotic device, or human operator.

Then, if the obstacle costmap indicates there is an obstacle in the local path, the local path can be trimmed to account for the obstacle. Trimming of local paths to account for obstacles can both smooth stopping behavior and help ensure the robotic device stops as close to the path as feasible in avoiding a collision with the obstacle. Trimming can also occur based on the path itself. For example, a path can involve a direction change, such as changing directions to go forward, backward, or turning in place. If the robotic device approaches a direction change, the local path can be trimmed a point of the direction change; e.g., when the robotic device is to come to a stop before proceeding with the direction change.

Figure 14C:
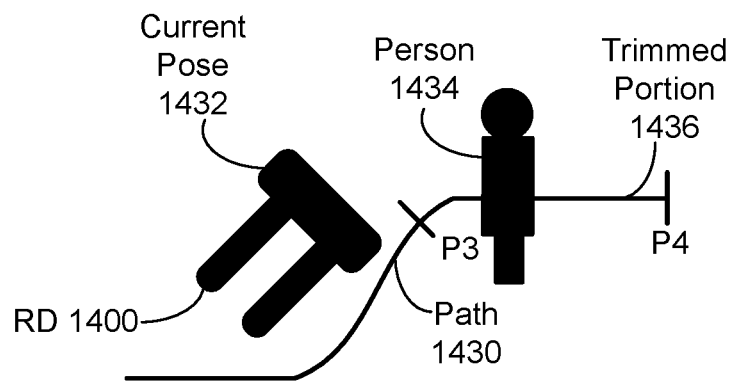
FIG. 14C shows an example of trimming a path for a robotic device due to an obstacle, in accordance with an example embodiment.

FIG. 14C shows an example of trimming path 1430 for robotic device 1400 due to an obstacle, in accordance with an example embodiment. Path 1430 can be followed by robotic device 1400, which is currently in local pose 1432. However, just after point P3 on path 1430, person 1434 has stepped onto path 1430. In the context of path planning for robotic device 1400, person 1434 can be considered to be a (mobile) obstacle blocking path 1430. As such, path 1430 can be trimmed to exclude trimmed portion 1436 between points P3 and P4. By trimming path 1430 at point P3, which is before the location of person 1434 along path 1430, robotic device 1400 can be instructed to stop at or near P3 in accordance with the trimmed path, and so avoid a collision with person 1434. Other examples of path trimming are possible as well.

5. One or more candidate trajectories can be generated. The candidate trajectories can be generated based on one or local paths. In some embodiments, a candidate trajectory can include a starting pose associated with a starting time at a beginning of a planning time interval and a later pose associated with an ending time of the planning time interval. The candidate trajectory can indicate movement of a robotic device from the starting pose at an angle based on the steering angle of the candidate trajectory and at a velocity based on a traction motor velocity of the candidate trajectory. Using this representation, the robotic device can be assumed to be at the starting pose at the starting time, and then travel during the planning time interval to reach the later pose at the ending time. In other embodiments, a trajectory can include information, such as instructions, specifying one or more state vectors and/or control vectors to direct a robotic device or other agent to travel between two locations.

An example state vector $\vec{x}$ can be represented as:

$$\vec{x} = (x, y, \theta, v, s), \text{ where}$$

x, y are two-dimensional coordinates for a location of the robotic device,

θ specifies an orientation angle for the robotic device, v is a velocity of a traction motor associated with the robotic device, and s is a steering angle for the robotic device.

The orientation angle can be an angle indicating how at least a portion, such as a body, of the robotic device is oriented. The velocity of the traction motor, which can propel the robotic device, can indirectly indicate the speed of the robotic device; i.e., the velocity of the traction motor can be proportional or otherwise relate to the speed of the robotic device. The steering angle can specify a direction in which the robotic device is to move.

An example control vector $\vec{u}$ can be represented as:

$$\vec{u} = (\dot{v}, \dot{s}), \text{ where}$$

$\dot{v}$ is a derivative of the velocity of the traction motor, and $\dot{s}$ is a derivative of the steering angle for the robotic device.

That is, $\vec{u}$ specifies changes in the velocity of the traction motor and the steering angle of the robotic device, and so specifies changes in the speed and direction of movement for the robotic device. As such, a trajectory T can be specified as a function of time; e.g., $T = (\vec{x}(t), \vec{u}(t))$. Candidate trajectories can be determined for a variety of locations, orientation angles, traction motor velocities, and steering angles, and derivatives of the traction motor velocities and steering angles.

Once candidate trajectories are generated, the candidate trajectories can be sampled. In some embodiments, trajectory sampling can be performed using a Dynamic Window Approach (DWA) over feasible traction velocities and steering positions. Some or all of the candidate trajectories can be stopping trajectories, where a stopping trajectory is a trajectory that terminates with the robotic device at a stop. Stopping trajectories can help ensure safety in the event of a failure to plan at a subsequent planning time interval. For example, a stopping trajectory can apply maximum deceleration to a motive source, such as a traction motor, at or near the end of the trajectory.

Figure 15:
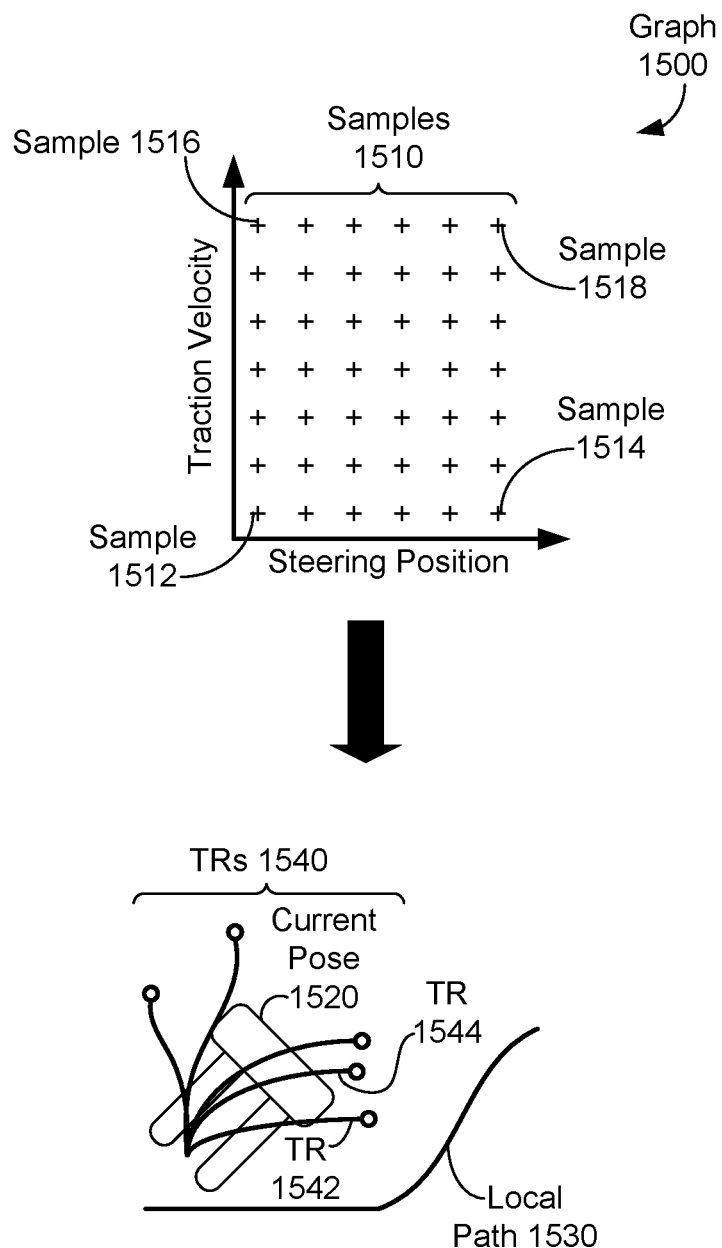
FIG. 15 shows a graph and related trajectories, in accordance with an example embodiment.

FIG. 15 shows graph 1500 and related trajectories 1540, in accordance with an example embodiment. Graph 1500 represents sampling trajectories using samples 1510 over a two-dimensional space, with a first dimension, represented by the X-axis of graph 1500, being steering position values, and a second dimension, represented by the Y-axis of graph 1500, being traction velocity values.

Each sample of samples 1510 can represent a pair (SP, TV), where SP is a steering position value, and TV is a value for a traction velocity. For example, let steering position values be expressed as angles measured in radians, and so have values in the range [0, 2π). Then, graph 1500 indicates that samples 1512 and 1516 have relatively small values for steering position SP; e.g., values slightly larger than 0, and samples 1514 and 1518 have relatively large values for steering position SP; e.g., values slightly less than 2π. Continuing this example, let each of the traction values be in the range [$TV_{min}$, $TV_{max}$], where $TV_{min}$ is the minimum possible traction velocity value and $TV_{max}$ is the maximum possible traction velocity value. Then, graph 1500 indicates that samples 1512 and 1514 have relatively small values for traction velocity TV; e.g., values slightly larger than $TV_{min}$, and samples 1516 and 1518 have relatively large values for traction velocity TV; e.g., values slightly less than $TV_{max}$.

Each pair (SP, TV) represented by a sample of samples 1510 can correspond to a trajectory. For example, suppose a robotic device is in the pose shown as current pose 1520 of FIG. 15 while traveling along local path 1530. Then, a first sample of samples 1510 can be associated with a pair (SP1, TV1). The pair (SP1, TV1) can be used to generate an instruction INST1 for the robotic device to steer at steering position SP1 and drive a traction motor with traction velocity TV1. Then, after the robotic device carries out instruction INST1, the robotic device can be directed along a first trajectory of trajectories 1540; e.g., the robotic device can follow trajectory 1542. Continuing this example, a second sample of samples 1510 can be associated with a pair (SP2, TV2). The pair (SP1, TV1) can be used to generate an instruction INST2 for the robotic device to steer at steering position SP2 and drive a traction motor with traction velocity TV2. Then, after the robotic device carries out instruction INST2, the robotic device can be directed along a second trajectory of trajectories 1540; e.g., the robotic device can follow trajectory 1544. Many other examples of sampling related to trajectories are possible as well.

6. The one or more candidate trajectories can be scored. The score for a candidate trajectory can be indicative of advancement from a starting pose to an ending pose. The score can be determined by simulating the steering position and the traction velocity for the planning time interval, where simulating the steering position and the traction velocity for the planning time interval can include calculating, pre-calculating, estimating, mathematically modeling, and/or using one or more other techniques to determine a simulated ending position for a robotic device that is assumed to start at the starting pose and travel during the planning time interval while maintaining the steering position and the traction velocity for the trajectory.

In some embodiments, the candidate trajectories can be scored based on one or more trajectory costs.

Figure 16:
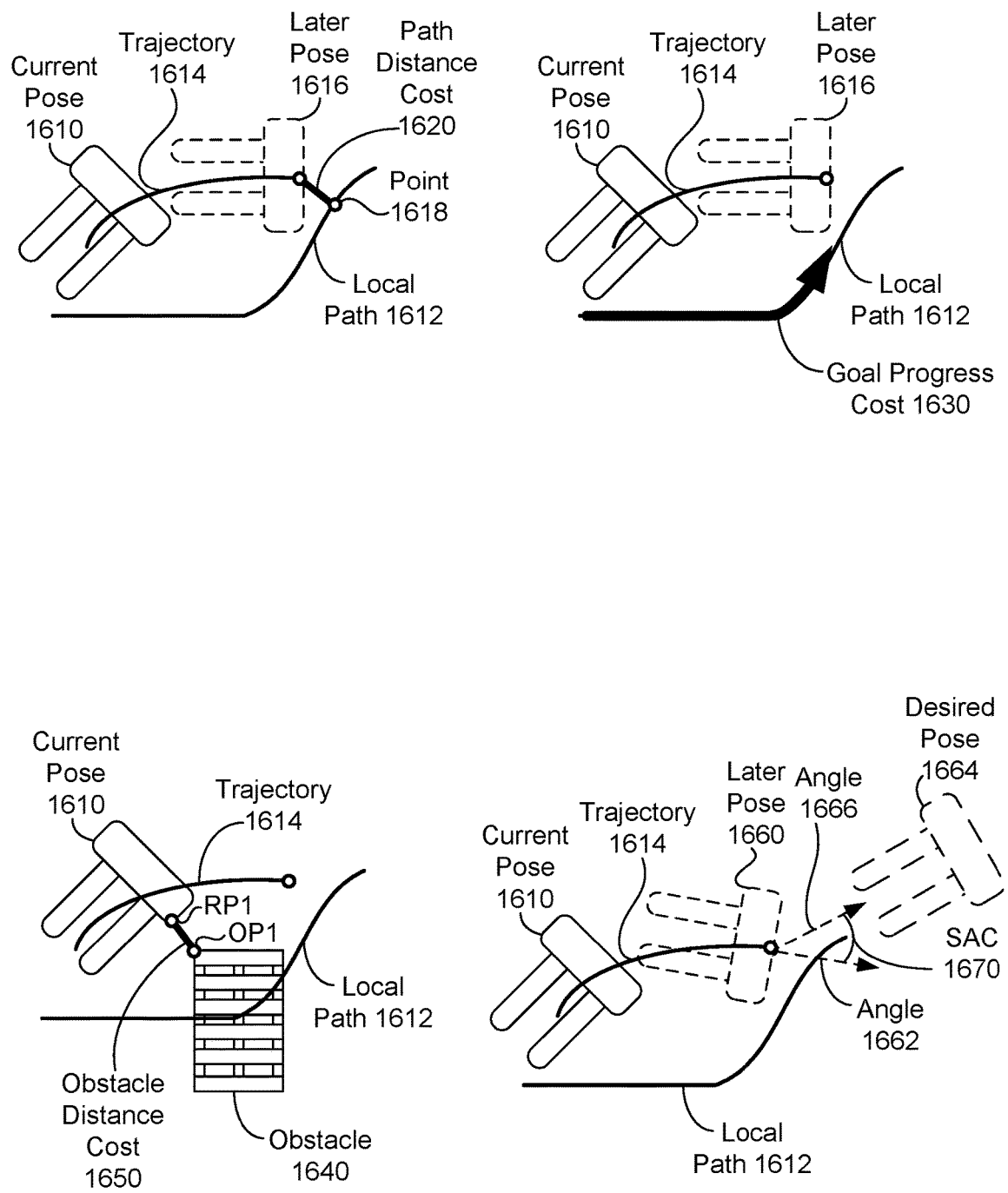
FIG. 16 illustrates various trajectory costs, in accordance with an example embodiment.

FIG. 16 illustrates various trajectory costs, in accordance with an example embodiment. Each candidate trajectory can be numerically scored, or graded, based on one or more trajectory costs. The trajectory costs can include, but are not limited to, numerical representations of:

Path distance cost, which can specify a quadratic or other penalty based on a distance between a specified point on a robotic device and its closest point on the path. An upper-left portion of FIG. 16 shows a robotic device at current pose 1610, where the robotic device is directed to travel along trajectory 1614 to reach later pose 1616. Then, FIG. 16 illustrates that path distance cost 1620 can be determined by a distance between the robotic device at later pose 1616 and a point on local path 1614.

Goal progress cost, which can specify an inverse quadratic or other penalty based on a distance that the robotic device progresses along the path in comparison to a maximum possible distance that the robotic device could progress along the path during a planning time interval. An upper-right portion of FIG. 16 shows a robotic device at current pose 1610 that is directed to travel along trajectory 1614 to reach later pose 1616. Then, FIG. 16 illustrates that goal progress cost 1630 can be determined by a distance that the robotic device progresses along the path upon reaching later pose 1616 in comparison to a maximum possible distance that the robotic device could have progressed along local path 1612 during a planning time interval. In this example, the planning time interval can take at least enough time to allow the robotic device to travel along trajectory 1614 from current pose 1610 to later pose 1616. In particular examples, the goal progress cost can be based on a comparison of the above-mentioned simulated ending position and the ending pose.

Obstacle distance cost, which can specify an inverse or other penalty based on how closely a robotic device approaches an obstacle or other object in the environment. In some embodiments, any trajectory that collides with an obstacle or passes into a hard padding zone, or region that may be too close to another object for safety's sake, such as a region within a predetermined distance (e.g., 5 inches, 10 cm, 20 feet, 2 meters) of the robotic device, can be considered as infeasible (i.e., be associated with a very large or infinite cost). A lower-left portion of FIG. 16 shows a robotic device currently at current pose 1610, where the robotic device is directed to travel along trajectory 1614 that comes close to obstacle 1640. Then, FIG. 16 illustrates that obstacle distance cost 1650 can be determined by a distance between points RP1 and OP1 that indicates how closely the robotic device at current pose 1610 approaches obstacle 1650, where point RP1 represents a closest point on the robotic device to obstacle 1650, and where point OP1 represents a closest point on obstacle 1650 to the robotic device.

Steering angle cost (SAC), which can specify a quadratic or other penalty for error between an actual steering angle θ at the end of the trajectory and an optimal steering angle θ' at the end of the trajectory. The optimal steering angle θ' can be specified as the angle corresponding to the direction of travel along the negative gradient of the combined path distance and goal progress cost functions. In some embodiments, such as when the steering angle cost is quadratic, the steering angle cost can be computed analytically. A lower-right portion of FIG. 16 shows a robotic device currently at current pose 1610, where the robotic device is directed to travel along trajectory 1614 to reach later pose 1660, where later pose 1660 indicates the robotic device is oriented to travel using a steering angle illustrated as angle 1662. In this example, at the end of trajectory 1614, the robotic device is desired to be oriented as shown by desired pose 1664 to travel using a steering angle illustrated as angle 1666. Then, FIG. 16 illustrates that steering angle cost 1670 can be determined as a difference between an actual steering angle of the robotic device at the end of trajectory 1614; e.g., angle 1662 of (actual) later pose 1660, and an optimal steering angle of the robotic device at the end of trajectory 1614; e.g., angle 1666 of desired pose 1664.

Traversal cost, which can be a cost associated with an amount of time that the robotic device takes and/or is simulated to take to travel along the trajectory.

Trajectory length cost, which can be a cost associated with a distance that the robotic device takes and/or is simulated to take to travel along the trajectory.

Actuator acceleration costs, which can be a cost associated with penalizing acceleration of one or more actuators, such as traction motors. In some embodiments, jointly minimizing actuator acceleration and time-related costs, such as the traversal cost, can yield smooth trajectories with lower power costs, thus enabling the robotic device to operate more efficiently and with less wear-and-tear due to abrupt stops and starts Then, once values for the trajectory costs are determined for a trajectory, the trajectory cost values can be summed, multiplied, or otherwise numerically combined (e.g., averaged, weighted averaged) to obtain a trajectory score for the trajectory. In other embodiments, trajectories can be scored non-numerically; e.g., based on letter grades, a high-medium-low cost scale, and/or some other non-numerical criteria. In even other embodiments, a highest ranking and/or lowest-cost trajectory can be considered as a nominal trajectory. Then, the nominal trajectory can be stored with a roadmap that includes a path between a starting position (or pose) and an ending position (or pose) that are related to a starting pose and/or an ending pose of the nominal trajectory. Then, when a request for a route through an environment modeled by the roadmap is received, a resulting response to the request can be include a portion of the roadmap that includes the nominal trajectory; i.e., when the nominal trajectory is at least part of the requested route through the environment.

In some embodiments, the trajectory generation technique can also include the following action:

7. Execute a highest ranking and/or lowest-cost trajectory. After candidate trajectories have been scored based on trajectory costs, a highest ranking and/or lowest cost trajectory can be provided to and then executed by the robotic device. For example, the highest ranking and/or lowest cost trajectory provided to the robotic device can be considered to be a nominal trajectory. In some embodiments, a generated trajectory can be followed by a trajectory follower. The trajectory follower can be software and/or hardware of the robotic device that can have a control loop that periodically sets e.g., every 0.1 seconds, every 0.05 seconds every 0.01 seconds, every 0.0025 seconds, steering position set points and traction velocities to achieve an integrated traction drive position. In particular embodiments, the trajectory follower can use a proportional-integral-derivative (PID) loop to set traction velocities. In other embodiments, the trajectory follower can gauge how well the robotic device is following the highest ranking, lowest-cost trajectory, and/or nominal trajectory based on one or more of the costs described with respect to Action 6 above.

In still other embodiments, planning system 110 and/or offboard planner 112 can formulate a control problem for directing a robotic device along a trajectory as one of stabilizing around a nominal trajectory. The nominal trajectory can be a target trajectory for the robotic device to aim for but may not be exactly followed during operation of the robotic device. The nominal trajectory can be derived from the path by applying inverse kinematics to the twist at every pose, or including joint states at generation time. Formally, given a state vector $\vec{x}=(x, y, \theta, v, s)$ and a control vector $\vec{u}=(\dot{v}, \dot{s})$ as discussed above in the context of FIG. 14C, a nominal trajectory can be determined as a function of time; e.g., a nominal trajectory $T=\{\vec{x}(t), \vec{u}(t)\}$. Then, a linear quadratic regulator can be used to stabilize the nominal trajectory T, where the kinematics of the nominal trajectory can be formulated using a differential equation, such as $\dot{\vec{x}}=A\vec{x}+B\vec{u}$. Quadratic costs associated with the linear quadratic regulator can be determined as an error term for each state variable, such as a weighted squared error term for each state variable.

Figure 17:
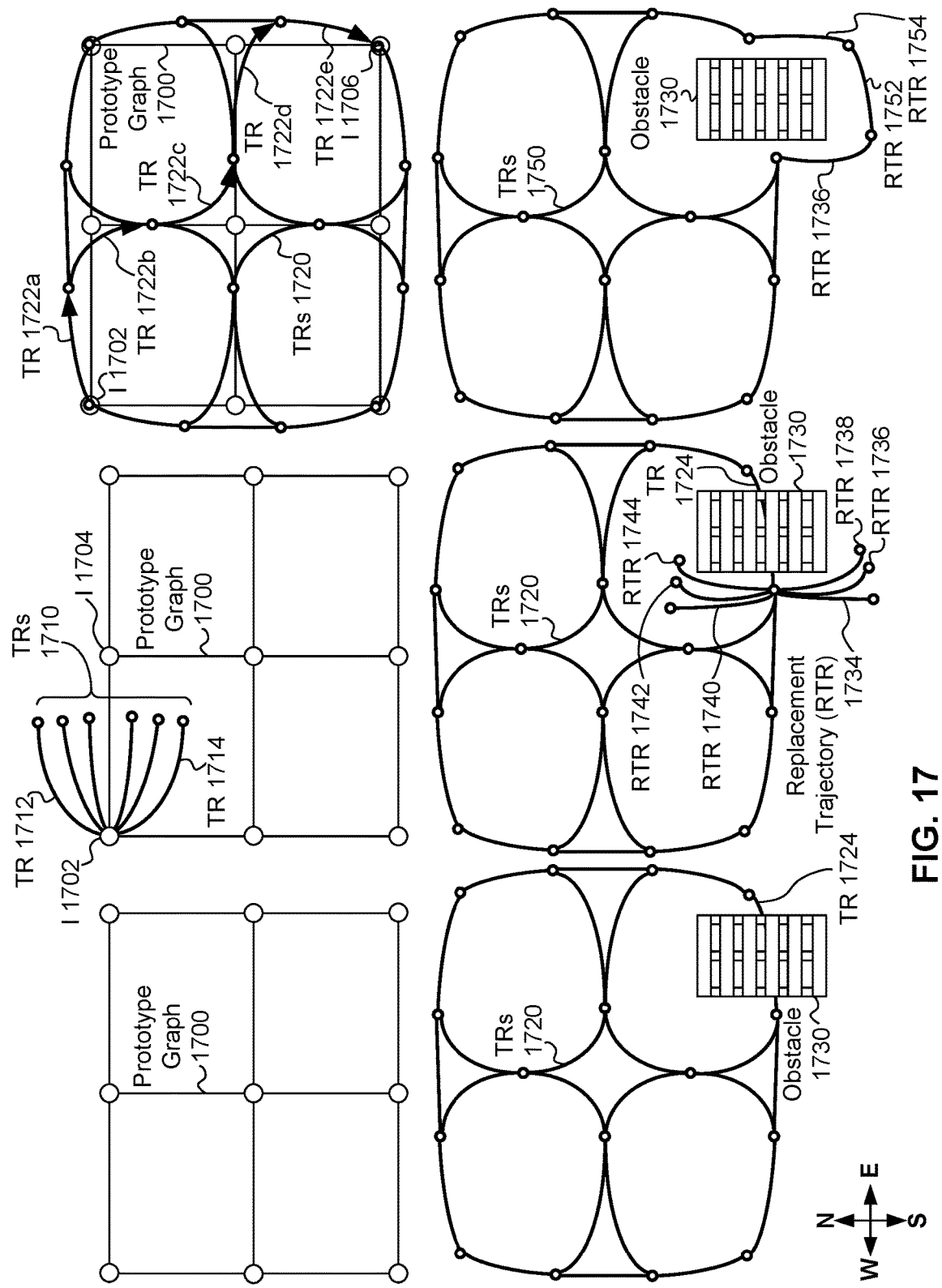
FIG. 17 illustrates a prototype graph of an environment and related trajectories, in accordance with an example embodiment.

FIG. 17 illustrates prototype graph 1700 of an environment and related trajectories, in accordance with an example embodiment. Prototype graph 1700 can be received, determined, or otherwise provided to planning system 110, offboard planner 112 and/or roadmap planner 114. Prototype graph 1700, shown at upper-left of FIG. 17, can serve as a roadmap representing part or all of an environment, such as discussed above in the context of prototype graph 600. Prototype graph 1700 uses nine intersections connected by twelve edges to represent (a portion of) the environment.

Then, planning system 110, offboard planner 112 and/or roadmap planner 114 can generate one or more trajectories based on the prototype graph 1700 to determine the replacement trajectories using the above-mentioned trajectory generation technique. At upper-center of FIG. 17, trajectories 1710 are shown being drawn that start from intersection 1702 in a generally eastward direction toward intersection 1704, where trajectories 1710 range from northernmost trajectory 1712 to southernmost trajectory 1714. Trajectories 1710 can be generated based on sampled steering position and traction velocity pairs, such as discussed above in the context of trajectories 1540 of FIG. 15, and then scored based upon one or more costs, such as discussed above in the context of FIG. 16.

Planning system 110, offboard planner 112 and/or roadmap planner 114 can score some or all of trajectories 1710 to determine one or more lower cost trajectories. The one or more lower cost trajectories between points associated with prototype graph 1700 can be selected as trajectories 1720. As upper-right of FIG. 17, trajectories 1720 are shown overlaying prototype graph 1700, indicating that trajectories 1720 can be used to traverse the environment represented by prototype graph 1700. For example, a robotic device can go from intersection 1702 at upper-left of prototype graph 1700 to intersection 1706 at lower-right of prototype graph 1700 by taking arrowed trajectories 1722a, 1722b, 1722c, 1722d, and 1722*e*. The one or more lower cost trajectories can be stored by planning system 110, offboard planner 112 and/or roadmap planner 114. For example, the one or more lower cost trajectories can be stored as nominal trajectories with prototype graph 1700.

If conditions change in the environment, planning system 110, offboard planner 112 and/or roadmap planner 114 can determine replacement trajectories to address the changing conditions. For example, at lower-left of FIG. 17, obstacle 1730 is shown as obstructing trajectory 1724 in a southeastern portion of trajectories 1720. Then, trajectories 1720 can be updated with one or more replacement trajectories (RTRs) to supplant trajectory 1724 and route around obstacle 1730.

After determining the conditions have changed in the environment, planning system 110, offboard planner 112 and/or roadmap planner 114 can determine the replacement trajectories using the above-mentioned trajectory generation technique. As shown at lower-center of FIG. 17, the above-mentioned trajectory generation technique can be applied to generate one or more replacement trajectories, such as replacement trajectories 1734, 1736, 1738, 1740, 1742, and 1744. For example, replacement trajectories 1734, 1736, 1738, 1740, 1742, and 1744 can be generated based on sampled steering position and traction velocity pairs, such as discussed above in the context of trajectories 1540 of FIG. 15, and then scored based upon one or more costs, including an obstacle distance cost related to obstacle 1730, such as discussed above in the context of FIG. 16.

Planning system 110, offboard planner 112 and/or roadmap planner 114 can score the replacement trajectories to determine one or more replacement trajectories to supplant trajectory 1724 that has been obstructed by obstacle 1730. The lower-right portion of FIG. 17 shows trajectories 1750, which includes trajectories 1720 less supplanted trajectory 1724, and including replacement trajectories 1736, 1752, and 1754 used to supplant trajectory 1724 and route around obstacle 1730. The one or more replacement trajectories can be stored by planning system 110, offboard planner 112 and/or roadmap planner 114. For example, the one or more replacement trajectories can be stored as nominal trajectories with prototype graph 1700. In particular examples, both the replacement trajectories and the supplanted trajectories can be stored to save resources in recalculating supplanted trajectory 1724 after obstacle 1730 is cleared.

In some embodiments, trajectories 1720 and/or trajectories 1754 can be further refined. For example, FIG. 17 shows that six candidate trajectories 1710 were used to determine one or more trajectories between intersections 1702 and 1704 that became part of trajectories 1720 and 1750. To refine trajectories 1720 and 1750, planning system 110, offboard planner 112 and/or roadmap planner 114 can generate additional candidate trajectories; e.g., by sampling more steering position and traction velocity pairs. Planning system 110, offboard planner 112 and/or roadmap planner 114 can score the additional candidate trajectories—if one of the additional candidate trajectories has a lowest cost among the additional candidate trajectories and a corresponding trajectory of trajectories 1720 and 1750, the corresponding trajectory of trajectories 1720 and 1750 can be replaced by the lowest cost trajectory. Thus, trajectories 1720 and 1750 can be refined by replacing one or more of trajectories 1720 and 1750 with lower cost trajectories. Any refined lowest cost trajectories can be stored by planning system 110, offboard planner 112 and/or roadmap planner 114.

Planning system 110, offboard planner 112 and/or roadmap planner 114 can generate and/or refine trajectories for part or all of an environment can occur based on one or more conditions. These conditions can occur: at system startup, at periodic intervals of time (e.g., every 10 minutes, every other hour twice a day, three times weekly), upon occurrence of certain events (e.g., an event related to obstruction of one or more trajectories, an event involving use of a new type of robotic device, an event related to a change in the environment such as adding or closing part or all of the environment), when usage of planning system 110, offboard planner 112 and/or roadmap planner 114 for other activities is below a usage threshold (i.e., a usage threshold indicating when planning system 110, offboard planner 112 and/or roadmap planner 114 has spare computation cycles to generate and/or refine trajectories), upon request by a user or other entity, and/or for other reasons.

Once generated and/or refined, planning system 110, offboard planner 112 and/or roadmap planner 114 can retrieve and/or provide the trajectories to robotic devices, such as robotic device 120 (e.g., for robotic device operation in the environment) periodically as discussed above in the context of FIG. 13, upon request by a robotic device, once an event has occurred, once one or more replacement trajectories have been generated, and/or for one or more other reasons. In particular, planning system 110, offboard planner 112 and/or roadmap planner 114 can retrieve one or more stored trajectories and provide the same one or more retrieved trajectories to multiple robotic devices; e.g., the one or more stored trajectories can be sent from planning system 110, offboard planner 112 and/or roadmap planner 114 as part of one or more responses to one or more corresponding requests for routes through the environment from the one or more robotic devices. As indicated above, the responses can include one or more portions of a roadmap, such as portion(s) of prototype graph 1700, and/or the one or more retrieved trajectories.

Generating and/or refining trajectories by planning system 110 can enable robotic devices to follow trajectories that are more complex than can be calculated in real time aboard the robotic device, to follow progressively better trajectories as trajectories are refined, enable rerouting when environmental conditions change, and save resources aboard the robotic device that would have had to be allocated to trajectory determination.

In some embodiments, trajectories such as trajectories 1720 and 1750 can be determined based on a roadmap graph, coordinated action plan, and/or discrete planning graph, rather than or along with a prototype graph such as prototype graph 1700. Other trajectory generation techniques and/or examples of trajectories are possible as well.

Computing Device Architecture

Figure 18A:
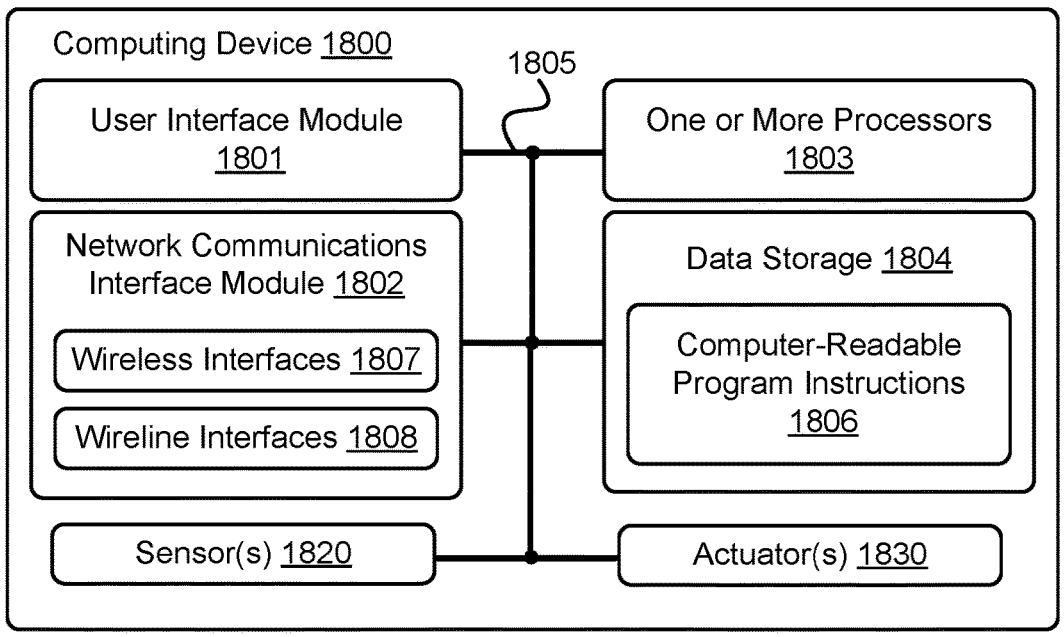
FIG. 18A is a functional block diagram of an example computing device, in accordance with an example embodiment.

FIG. 18A is a functional block diagram of computing device 1800 (e.g., system, in accordance with an example embodiment. In particular, computing device 1800 shown in FIG. 18A can be configured to perform at least one function related to one or more of: planning system 110, offboard planner 112, roadmap planner 114, robotic device 120, onboard software 130, hardware 150, system 200, warehouse management system 210, executor 220, logistics interface 310, network 318, onboard system 320, onboard sensors 322, planning/execution processors 324, network switch 330, vehicle controller 332, programmable logic controller 334, vehicle master 336, device sensors 338, drives 340, robotic device architecture 400, laser scanner architecture 500, and methods 1900 and 2000. Computing device 1800 may include a user interface module 1801, a network-communication interface module 1802, one or more processors 1803, data storage 1804, one or more sensors 1820, and one or more actuators 1830, all of which may be linked together via a system bus, network, or other connection mechanism 1805. In some embodiments, computing device 1800 can be configured to act as part or all of a warehouse control system.

User interface module 1801 can be operable to send data to and/or receive data from external user input/output devices. For example, user interface module 1801 can be configured to send and/or receive data to and/or from user input devices such as a keyboard, a keypad, a touch screen, a computer mouse, a track ball, a joystick, a camera, a voice recognition module, and/or other similar devices. User interface module 1801 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1801 can also be configured to generate audible output(s), such as a speaker, speaker jack, audio output port, audio output device, earphones, and/or other similar devices.

Network-communications interface module 1802 can include one or more wireless interfaces 1807 and/or one or more wireline interfaces 1808 that are configurable to communicate via a network. Wireless interfaces 1807 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 1808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1802 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Processors 1803 can include one or more general purpose processors, and/or one or more special purpose processors (e.g., digital signal processors, graphics processing units, application specific integrated circuits, etc.). Processors 1803 can be configured to execute computer-readable program instructions 1806 that are contained in the data storage 1804 and/or other instructions as described herein.

Data storage 1804 can include one or more computer-readable storage media that can be read and/or accessed by at least one of processors 1803. The one or more computer-readable storage media can include volatile and/or non-volatile storage components, such as optical, magnetic, organic or other memory or disc storage, which can be integrated in whole or in part with at least one of processors 1803. In some embodiments, data storage 1804 can be implemented using a single physical device (e.g., one optical, magnetic, organic or other memory or disc storage unit), while in other embodiments, data storage 1804 can be implemented using two or more physical devices.

Data storage 1804 can include computer-readable program instructions 1806 and perhaps additional data. In some embodiments, data storage 1804 can additionally include storage required to perform at least part of the herein-described methods and techniques and/or at least part of the functionality of the devices and networks.

In some embodiments, computing device 1800 can include one or more sensors 1820. Sensor(s) 1820 can be configured to measure conditions in an environment for computing device 1800 and provide data about that environment; e.g., environment 100. For example, sensor(s) 1820 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 1800, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 1800, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 1800, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 1820 are possible as well.

Computing device 1800 can include one or more actuators 1830 that enable computing device 1800 to initiate movement. For example, actuator(s) 1830 can include or be incorporated with robotic joints connecting robotic limbs to a robotic body. For example, actuator(s) 1830 can include respective robotic hip and robotic shoulder joints connecting respective robotic legs and arms to the robotic body. Further, the actuator(s) 1830 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 1830 can include respective robotic ankle joints connecting the robotic legs to robotic feet and respective robotic wrist joints connecting the robotic arms to robotic hands. In addition, actuator(s) 1830 can include motors for moving the robotic limbs. As such, the actuator(s) 1830 can enable mobility of computing device 1800. Many other examples of actuator(s) 1830 are possible as well.

Cloud-Based Servers

Figure 18B:
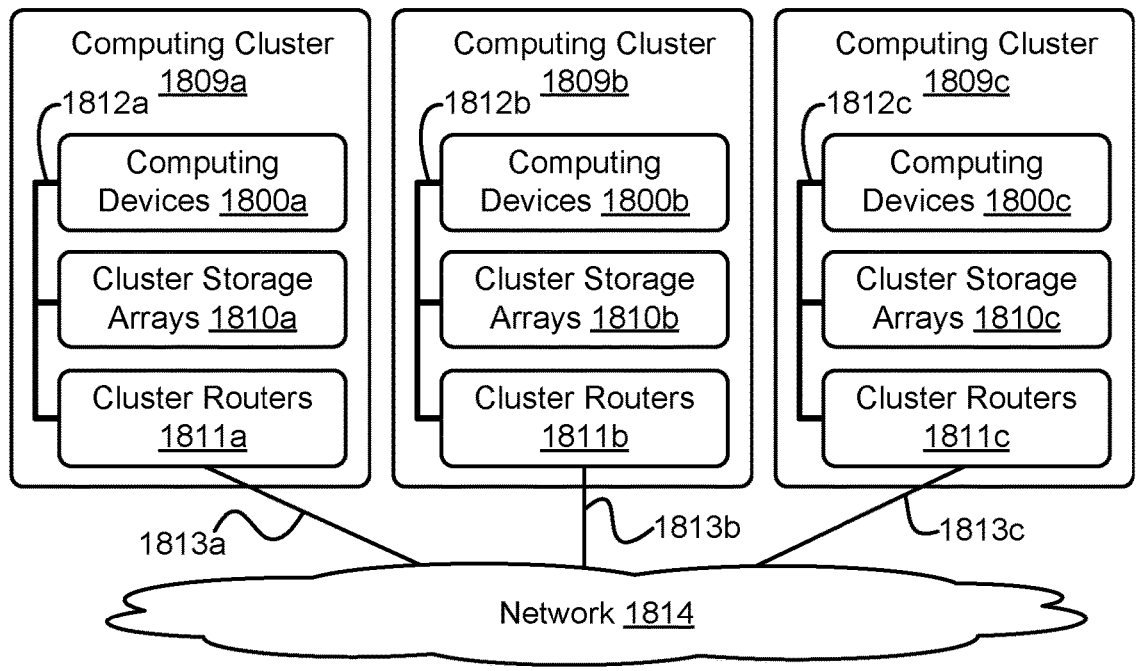
FIG. 18B depicts a network of computing clusters arranged as a cloud-based server system, in accordance with an example embodiment.

FIG. 18B depicts a network 1814 of computing clusters 1809a, 1809b, 1809c arranged as a cloud-based server system in accordance with an example embodiment. Computing clusters 1809a, 1809b, 1809c can be cloud-based devices that store program logic and/or data of cloud-based applications and/or services; e.g., perform at least one function related to one or more of: planning system 110, offboard planner 112, roadmap planner 114, robotic device 120, onboard software 130, hardware 150, system 200, warehouse management system 210, executor 220, logistics interface 310, network 318, onboard system 320, onboard sensors 322, planning/execution processors 324, network switch 330, vehicle controller 332, programmable logic controller 334, vehicle master 336, device sensors 338, drives 340, robotic device architecture 400, laser scanner architecture 500, and methods 1900 and 2000.

In some embodiments, computing clusters 1809a, 1809b, 1809c can be a single computing device residing in a single computing center. In other embodiments, computing clusters 1809a, 1809b, 1809c can include multiple computing devices in a single computing center, or even multiple computing devices located in multiple computing centers located in diverse geographic locations. For example, FIG. 18B depicts each of computing clusters 1809a, 1809b, 1809c residing in different physical locations.

In some embodiments, data and services at computing clusters 1809a, 1809b, 1809c can be encoded as computer readable information stored in non-transitory, tangible computer readable media (or computer readable storage media) and accessible by other computing devices. In some embodiments, computing clusters 1809a, 1809b, 1809c can be stored on a single disk drive or other tangible storage media, or can be implemented on multiple disk drives or other tangible storage media located at one or more diverse geographic locations.

FIG. 18B depicts a cloud-based server system in accordance with an example embodiment. In FIG. 18B, functionality of a planning system can be distributed among three computing clusters 1809a, 1809b, and 1809c. Computing cluster 1809a can include one or more computing devices 1800a, cluster storage arrays 1810a, and cluster routers 1811a connected by a local cluster network 1812a. Similarly, computing cluster 1809b can include one or more computing devices 1800b, cluster storage arrays 1810b, and cluster routers 1811b connected by a local cluster network 1812b. Likewise, computing cluster 1809c can include one or more computing devices 1800c, cluster storage arrays 1810c, and cluster routers 1811c connected by a local cluster network 1812c.

In some embodiments, each of the computing clusters 1809a, 1809b, and 1809c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1809a, for example, computing devices 1800a can be configured to perform various computing tasks of a planning system, a robotic device, and/or a computing device. In one embodiment, the various functionalities of a planning system, a robotic device, and/or a computing device can be distributed among one or more computing devices 1800a, 1800b, and 1800c. Computing devices 1800b and 1800c in respective computing clusters 1809b and 1809c can be configured similarly to computing devices 1800a in computing cluster 1809a. On the other hand, in some embodiments, computing devices 1800a, 1800b, and 1800c can be configured to perform different functions.

In some embodiments, computing tasks and stored data associated with a planning system, a robotic device, and/or a computing device can be distributed across computing devices 1800a, 1800b, and 1800c based at least in part on the processing requirements of a roadmap editor, single agent planning software, multiple agent planning software, a routing computing device, and/or a computing device, the processing capabilities of computing devices 1800a, 1800b, and 1800c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1810a, 1810b, and 1810c of the computing clusters 1809a, 1809b, and 1809c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a planning system, a robotic device, and/or a computing device can be distributed across computing devices 1800a, 1800b, and 1800c of computing clusters 1809a, 1809b, and 1809c, various active portions and/or backup portions of these components can be distributed across cluster storage arrays 1810a, 1810b, and 1810c. For example, some cluster storage arrays can be configured to store one portion of the data of a planning system, a robotic device, and/or a computing device can, while other cluster storage arrays can store other portion(s) of data of a planning system, a robotic device, and/or a computing device. Additionally, some cluster storage arrays can be configured to store backup versions of data stored in other cluster storage arrays.

The cluster routers 1811a, 1811b, and 1811c in computing clusters 1809a, 1809b, and 1809c can include networking equipment configured to provide internal and external communications for the computing clusters. For example, the cluster routers 1811a in computing cluster 1809a can include one or more internet switching and routing devices configured to provide (i) local area network communications between the computing devices 1800a and the cluster storage arrays 1810a via the local cluster network 1812a, and (ii) wide area network communications between the computing cluster 1809a and the computing clusters 1809b and 1809c via the wide area network connection 1813a to network 1814. Cluster routers 1811b and 1811c can include network equipment similar to the cluster routers 1811a, and cluster routers 1811b and 1811c can perform similar networking functions for computing clusters 1809b and 1809b that cluster routers 1811a perform for computing cluster 1809a.

In some embodiments, the configuration of the cluster routers 1811a, 1811b, and 1811c can be based at least in part on the data communication requirements of the computing devices and cluster storage arrays, the data communications capabilities of the network equipment in the cluster routers 1811a, 1811b, and 1811c, the latency and throughput of local networks 1812a, 1812b, 1812c, the latency, throughput, and cost of wide area network links 1813a, 1813b, and 1813c, and/or other factors that can contribute to the cost, speed, fault-tolerance, resiliency, efficiency and/or other design criteria of the moderation system architecture.

Example Methods of Operation

FIG. 19 is a flowchart of method 1900, in accordance with an example embodiment. Method 1900 can be executed by a computing device, such as computing device 1800. Method 1900 can begin at block 1910, where a computing device can determine a roadmap that includes a path associated with a starting pose and an ending pose to be traversed by a robotic device in an environment, such as discussed above at least in the context of FIGS. 1, 6-8B and 17. In some embodiments, the path can include a portion of an Euler spiral such as discussed above at least in the context of FIGS. 7-8B.

At block 1920, the computing device can generate a plurality of trajectories from the starting pose, where each trajectory of the plurality of trajectories includes a steering position and a traction velocity for directing the robotic device during a planning time interval, such as discussed above at least in the context of FIGS. 15-17.

At block 1930, for each trajectory of the plurality of trajectories, the computing device can determine a score for the trajectory indicative of advancement from the starting pose toward the ending pose after simulating the steering position and the traction velocity for the planning time interval, such as discussed above at least in the context of FIGS. 16 and 17.

In some embodiments, the score for the trajectory can be further related to an obstacle distance cost indicating how closely the robotic device approaches an obstacle in the environment, such as discussed above at least in the context of FIGS. 16 and 17. In other embodiments, the score for the trajectory can be further related to a traversal cost indicating an amount of time that the robotic device takes to travel along the trajectory, such as discussed above at least in the context of FIG. 16.

At block 1940, the computing device can select a nominal trajectory from among the scored plurality of trajectories, such as discussed above at least in the context of FIGS. 16 and 17.

In some embodiments, selecting the nominal trajectory from among the scored plurality of trajectories can include: selecting the nominal trajectory as a minimum-cost trajectory of the scored plurality of trajectories, where the minimum-cost trajectory has a minimum score over all trajectories in the scored plurality of trajectories, such as discussed above at least in the context of FIGS. 16 and 17.

At block 1950, the computing device can store the nominal trajectory with the roadmap, such as discussed above at least in the context of FIGS. 16 and 17.

At block 1960, the computing device can receive a first request to provide a route through the environment, such as discussed above at least in the context of FIG. 17.

At block 1970, the computing device can send a first response to the first request, the first response including a portion of the roadmap, where the portion of the roadmap includes the stored nominal trajectory, such as discussed above at least in the context of FIG. 17.

In some embodiments, method 1900 can further include: determining, by the computing device, that an obstacle has been detected in the environment, where the obstacle blocks the path; generating, by the computing device, a second plurality of trajectories from the starting pose, where each trajectory of the second plurality of trajectories includes a steering position and a traction velocity for directing the robotic device during the planning time interval; for each trajectory of the second plurality of trajectories, determining, by the computing device, a score for the trajectory that is indicative of advancement from the starting pose toward the ending pose after simulating the steering position and the traction velocity for the planning time interval and indicative of how closely the robotic device approaches the obstacle; selecting, by the computing device, a second nominal trajectory from among the scored second plurality of trajectories; and storing the second nominal trajectory with the roadmap using the computing device, such as discussed above at least in the context of FIG. 17.

In other embodiments, method 1900 can further include: receiving, at the computing device, a second request to provide a route through the environment, where the second request differs from the first request; and sending a second response to the second request using the computing device, the second response including the portion of the roadmap that includes the stored nominal trajectory, such as discussed above at least in the context of FIG. 17.

In still other embodiments, method 1900 can further include: reducing the planning time interval to a reduced planning time interval using the computing device; generating, by the computing device, a second plurality of trajectories from the starting pose using the computing device, where each trajectory of the second plurality of trajectories comprises a steering position and a traction velocity for directing the robotic device during the reduced planning time interval; for each trajectory of the second plurality of trajectories, the computing device determining a score for the trajectory indicative of advancement from the starting pose toward the ending pose after simulating the steering position and the traction velocity for the reduced planning time interval; selecting a second nominal trajectory from among the scored second plurality of trajectories using the computing device; and storing the second nominal trajectory with the roadmap using the computing device, such as discussed above at least in the context of FIGS. 14A, 14B, and 17.

FIG. 20 is a flowchart of method 2000, in accordance with an example embodiment. Method 2000 can be executed by a computing device, such as computing device 1800. Method 2000 can begin at block 2010, where a computing device can receive a roadmap representing a plurality of paths through an environment, such as discussed above at least in the context of FIGS. 1, 6-8B, and 10A.

At block 2020, the computing device can discretize the roadmap to obtain a discrete planning graph, where the discrete planning graph includes a plurality of states corresponding to discretized path segments of the plurality of paths of the roadmap such that states corresponding to adjacent discretized path segments are connected in the discrete planning graph, such as discussed above at least in the context of FIG. 10B.

In some embodiments, discretizing the roadmap to obtain the discrete planning graph can include: determining an uniform path length based on one or more parameters; segmenting the roadmap so that each discretized path segment has a path length that is substantially equal to the uniform path length; determining the plurality of states based on the segmented roadmap; and determining a plurality of edges that connect the plurality of states based on connectivity of the roadmap, such as discussed above at least in the context of FIG. 10B. In particular of these embodiments, the one or more parameters can include one or more of: a time parameter and a length parameter, such as discussed above at least in the context of FIG. 10B.

In other embodiments, the roadmap includes a plurality of intersections. Then, discretizing the roadmap to obtain a discrete planning graph can include removing one or more intersections of the roadmap prior to discretizing the roadmap, such as discussed above at least in the context of FIGS. 2 and 10A.

At block 2030, the computing device can determine a Boolean equation representing at least a portion of the discrete planning graph, such as discussed above at least in the context of FIGS. 11 and 12.

In some embodiments, the Boolean equation can include a Boolean variable representing a location of the robotic device at a particular time, such as discussed above at least in the context of FIGS. 11 and 12.

In other embodiments, determining the Boolean equation representing at least a portion of the discrete planning graph can include determining the Boolean equation representing at least a portion of the discrete planning graph based on a footprint of the robotic device, such as discussed above at least in the context of FIG. 11. In particular of these embodiments, determining the Boolean equation representing at least a portion of the discrete planning graph based on the footprint of the robotic device can include: determining the footprint of the robotic device; for each discretized path segment of the discretized path segments, determining a swept path segment by at least sweeping the footprint of the robotic device over the discretized path segment; determining whether at least one pair of swept path segments overlap; and after determining that at least one pair of swept path segments do overlap, adding at least one collision clause to the Boolean equation representing a condition that the at least one pair of swept path segments do overlap, such as discussed above at least in the context of FIG. 11. In more particular of these embodiments, the robotic device is part of a plurality of robotic devices, and the at least one collision clause is used to simultaneously plan non-conflicting routes for the plurality of robotic devices, such as discussed above at least in the context of FIG. 11.

At block 2040, the computing device can determine a sequence of states from the plurality of states of the discrete planning graph such that the determined sequence of states satisfies the Boolean equation, such as discussed above at least in the context of FIG. 11.

At block 2050, the computing device can provide a route through the environment for a robotic device based on the determined sequence of states, such as discussed above at least in the context of FIGS. 11 and 12.

In some embodiments, method 2000 can further include: determining whether the Boolean equation is satisfiable; after determining that the Boolean equation is satisfiable: determining one or more satisfied states of the at least the portion of the discrete planning graph associated with the satisfied Boolean equation, and determining a path for the robotic device in the environment based on the one or more satisfied states of the at least the portion of the discrete planning graph, such as discussed above at least in the context of FIGS. 11 and 12. In particular embodiments, the path through the environment can correspond to the one or more satisfied states of the discrete planning graph, such as discussed above at least in the context of FIGS. 11 and 12.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
receiving, by a computing device, a roadmap representing a plurality of paths through an environment;
discretizing the roadmap, by the computing device, to obtain a discrete planning graph, wherein the discrete planning graph comprises a plurality of states corresponding to discretized path segments of the plurality of paths of the roadmap such that states corresponding to adjacent discretized path segments are connected in the discrete planning graph;
determining, by the computing device, a Boolean equation representing at least a portion of the discrete planning graph, wherein the Boolean equation comprises a plurality of Boolean clauses, wherein the plurality of Boolean clauses comprise a plurality of Boolean variables, wherein each Boolean variable of the plurality of Boolean variables represents a possible state of a robotic device in the discrete planning graph at one of a plurality of times;
determining, by the computing device, a set of values comprising a value of true or false for each Boolean variable of the plurality of Boolean variables, wherein the set of values satisfies the Boolean equation, wherein the set of values indicates a sequence of states for the robotic device to occupy from the plurality of states of the discrete planning graph, and wherein the sequence of states for the robotic device to occupy is represented by Boolean variables having a determined value of true; and
providing, by the computing device, a route through the environment for the robotic device to cause the robotic device to occupy each state in the sequence of states over the plurality of times.

2. The method of claim 1, wherein discretizing the roadmap to obtain the discrete planning graph comprises:
determining an uniform path length based on one or more parameters;
segmenting the roadmap so that each discretized path segment has a path length that is substantially equal to the uniform path length;
determining the plurality of states based on the segmented roadmap; and
determining a plurality of edges that connect the plurality of states based on connectivity of the roadmap.

3. The method of claim 2, wherein the one or more parameters include one or more of: a time parameter and a length parameter.

4. The method of claim 1, wherein determining the Boolean equation representing at least a portion of the discrete planning graph comprises determining the Boolean equation representing at least a portion of the discrete planning graph based on a footprint of the robotic device.

5. The method of claim 4, wherein determining the Boolean equation representing at least a portion of the discrete planning graph based on the footprint of the robotic device comprises:

determining the footprint of the robotic device;
for each discretized path segment of the discretized path segments, determining a swept path segment by at least sweeping the footprint of the robotic device over the discretized path segment;
determining whether at least one pair of swept path segments overlap; and
after determining that at least one pair of swept path segments do overlap, adding at least one collision clause to the Boolean equation representing a condition that the at least one pair of swept path segments do overlap.

6. The method of claim 5, wherein the robotic device is part of a plurality of robotic devices, and wherein the at least one collision clause is used to simultaneously plan non-conflicting routes for the plurality of robotic devices.

7. The method of claim 1, wherein the roadmap comprises a plurality of intersections, and wherein discretizing the roadmap to obtain a discrete planning graph comprises removing one or more intersections of the roadmap prior to discretizing the roadmap.

8. The method of claim 1, wherein the Boolean equation is expressed in a conjunctive normal form.

9. The method of claim 1, wherein determining the set of values for the plurality of Boolean variables which satisfies the Boolean equation comprises using a SAT solver.

10. The method of claim 1, wherein the plurality of Boolean clauses comprise at least a start and goal clause, a flow conservation clause, and a collision clause.

11. A computing device, comprising:
one or more processors; and
data storage including at least computer-executable instructions stored thereon that, when executed by the one or more processors, cause the computing device to perform functions comprising:
receiving a roadmap representing a plurality of paths through an environment;
discretizing the roadmap to obtain a discrete planning graph, wherein the discrete planning graph comprises a plurality of states corresponding to discretized path segments of the plurality of paths of the roadmap such that states corresponding to adjacent discretized path segments are connected in the discrete planning graph;
determining a Boolean equation representing at least a portion of the discrete planning graph, wherein the Boolean equation comprises a plurality of Boolean clauses, wherein the plurality of Boolean clauses comprise a plurality of Boolean variables, wherein each Boolean variable of the plurality of Boolean variables represents a possible state of a robotic device in the discrete planning graph at one of a plurality of times;
determining a set of values comprising a value of true or false for each Boolean variable of the plurality of Boolean variables, wherein the set of values satisfies the Boolean equation, wherein the set of values indicates a sequence of states for the robotic device to occupy from the plurality of states of the discrete planning graph, and wherein the sequence of states for the robotic device to occupy is represented by Boolean variables having a determined value of true; and
providing a route through the environment for the robotic device based on the determined sequence of states to cause the robotic device to occupy each state in the sequence of states over the plurality of times.

12. The computing device of claim 11, wherein discretizing the roadmap to obtain the discrete planning graph comprises:

determining an uniform path length based on one or more parameters;

segmenting the roadmap so that each discretized path segment has a path length that is substantially equal to the uniform path length;

determining the plurality of states based on the segmented roadmap; and determining a plurality of edges that connect the plurality of states based on connectivity of the roadmap.

13. The computing device of claim 12, wherein the one or more parameters include one or more of: a time parameter and a length parameter.

14. The computing device of claim 11, wherein determining the Boolean equation representing at least a portion of the discrete planning graph comprises determining the Boolean equation representing at least a portion of the discrete planning graph based on a footprint of the robotic device.

15. The computing device of claim 14, wherein determining the Boolean equation representing at least a portion of the discrete planning graph based on the footprint of the robotic device comprises:

determining the footprint of the robotic device;

for each discretized path segment of the discretized path segments, determining a swept path segment by at least sweeping the footprint of the robotic device over the discretized path segment;

determining whether at least one pair of swept path segments overlap; and after determining that at least one pair of swept path segments do overlap, adding at least one collision clause to the Boolean equation representing a condition that the at least one pair of swept path segments do overlap.

16. The computing device of claim 15, wherein the robotic device is part of a plurality of robotic devices, and wherein the at least one collision clause is used to simultaneously plan non-conflicting routes for the plurality of robotic devices.

17. The computing device of claim 11, wherein the roadmap comprises a plurality of intersections, and wherein discretizing the roadmap to obtain a discrete planning graph comprises removing one or more intersections of the roadmap prior to discretizing the roadmap.

18. The computing device of claim 11, wherein the Boolean equation is expressed in a conjunctive normal form.

19. A non-transitory computer readable medium having stored thereon instructions, that when executed by one or more processors of a computing device, cause the computing device to perform functions comprising:

receiving a roadmap representing a plurality of paths through an environment;

discretizing the roadmap to obtain a discrete planning graph, wherein the discrete planning graph comprises a plurality of states corresponding to discretized path segments of the plurality of paths of the roadmap such that states corresponding to adjacent discretized path segments are connected in the discrete planning graph;

determining a Boolean equation representing at least a portion of the discrete planning graph, wherein the Boolean equation comprises a plurality of Boolean clauses, wherein the plurality of Boolean clauses comprise a plurality of Boolean variables, wherein each Boolean variable of the plurality of Boolean variables represents a possible state of a robotic device in the discrete planning graph at one of a plurality of times;

determining a set of values comprising a value of true or false for each Boolean variable of the plurality of Boolean variables, wherein the set of values satisfies the Boolean equation, wherein the set of values indicates a sequence of states for the robotic device to occupy from the plurality of states of the discrete planning graph, and wherein the sequence of states for the robotic device to occupy is represented by Boolean variables having a determined value of true; and providing a route through the environment for the robotic device to cause the robotic device to occupy each state in the sequence of states over the plurality of times.

* * * * *